United States Patent
Tamaki et al.

(10) Patent No.: US 9,599,854 B2
(45) Date of Patent: Mar. 21, 2017

(54) LIQUID CRYSTAL DISPLAY DEVICE AND ELECTRONIC APPARATUS

(71) Applicant: Japan Display Inc., Tokyo (JP)

(72) Inventors: Masaya Tamaki, Tokyo (JP); Masashi Mitsui, Tokyo (JP)

(73) Assignee: Japan Display Inc., Tokyo (JP)

( * ) Notice: Subject to any disclaimer, the term of this patent is extended or adjusted under 35 U.S.C. 154(b) by 257 days.

(21) Appl. No.: 14/208,578

(22) Filed: Mar. 13, 2014

(65) Prior Publication Data

US 2014/0285757 A1 Sep. 25, 2014

(30) Foreign Application Priority Data

Mar. 25, 2013 (JP) ................................ 2013-063106

(51) Int. Cl.
G02F 1/1335 (2006.01)
G02F 1/1337 (2006.01)
G02F 1/1362 (2006.01)
G02F 1/13363 (2006.01)

(52) U.S. Cl.
CPC ...... G02F 1/133553 (2013.01); G02F 1/1362 (2013.01); G02F 1/133555 (2013.01); G02F 1/133707 (2013.01); G02F 2001/133638 (2013.01)

(58) Field of Classification Search
CPC ......... G02F 1/133555; G02F 1/133707; G02F 1/1362; G02F 2001/133638
See application file for complete search history.

(56) References Cited

U.S. PATENT DOCUMENTS

| 6,552,767 | B1* | 4/2003 | Kaneko | G02F 1/13363 349/113 |
|---|---|---|---|---|
| 2012/0313906 | A1* | 12/2012 | Tamaki | G02F 1/133555 345/204 |
| 2014/0022499 | A1* | 1/2014 | Tamaki | G02F 1/13439 349/106 |
| 2014/0300845 | A1* | 10/2014 | Tamaki | G02F 1/133514 349/65 |

FOREIGN PATENT DOCUMENTS

| JP | 09-230333 A | 9/1997 |
| JP | 2011-064885 | 3/2011 |
| JP | 2012-208212 A | 10/2012 |
| JP | 2012-255908 A | 12/2012 |
| JP | 2013-003467 A | 1/2013 |
| WO | WO-00/48039 A1 | 8/2000 |

OTHER PUBLICATIONS

Japanese Office Action issued Jul. 21, 2015 for corresponding Japanese Application No. 2013-063106.

* cited by examiner

*Primary Examiner* — Ryan Crockett
(74) *Attorney, Agent, or Firm* — Michael Best & Friedrich LLP

(57) ABSTRACT

According an aspect, a liquid crystal display device includes: a first substrate on which a reflective electrode is arranged for each of a plurality of pixels; a second substrate; a liquid crystal layer arranged between the first substrate and the second substrate; and a wave plate in which liquid crystals are fixed so that an alignment direction of the liquid crystals is opposite to an alignment direction of the liquid crystal layer. The wave plate is arranged on a second substrate side of the liquid crystal layer.

12 Claims, 27 Drawing Sheets

FIG.19
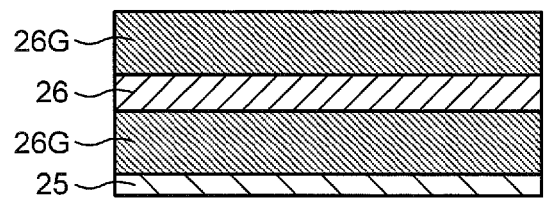
FIG.20
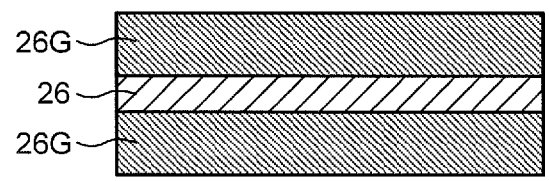
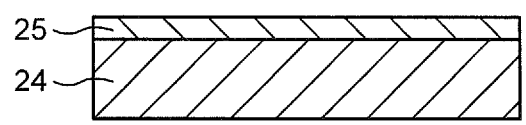
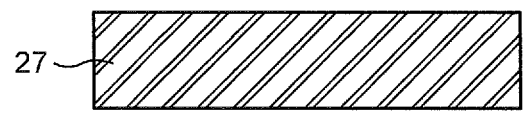

FIG.21
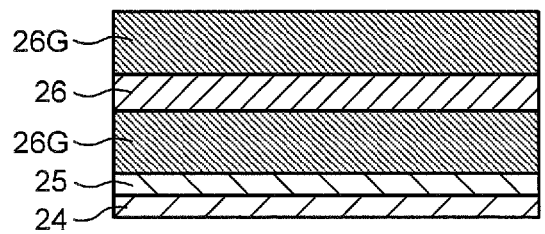
FIG.22
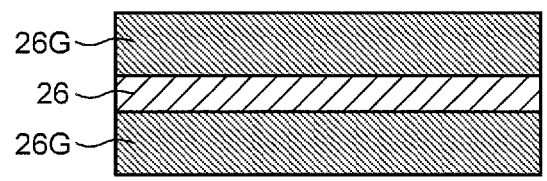
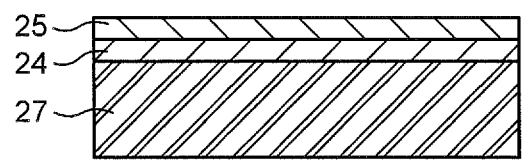

FIG.23
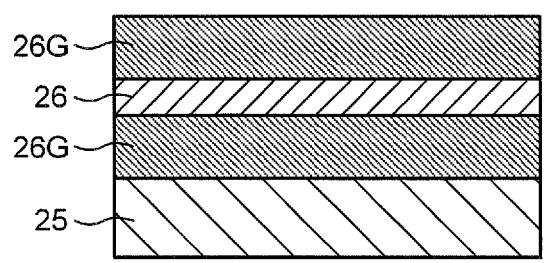
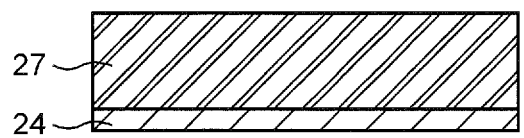
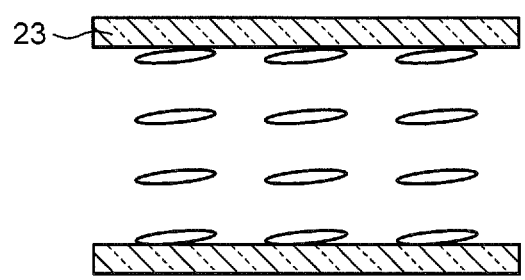

FIG.24
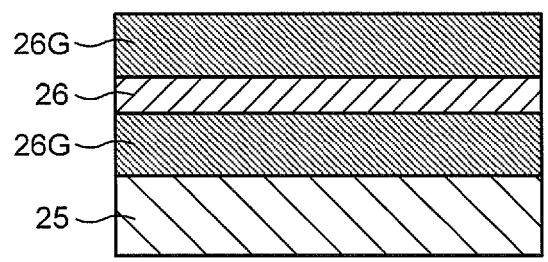
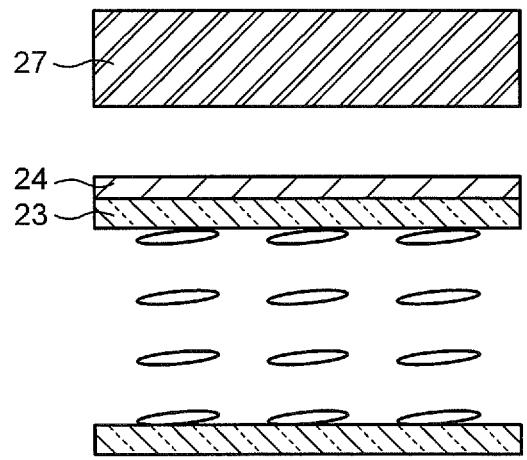

FIG.25
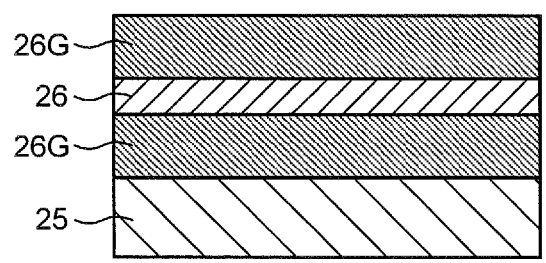
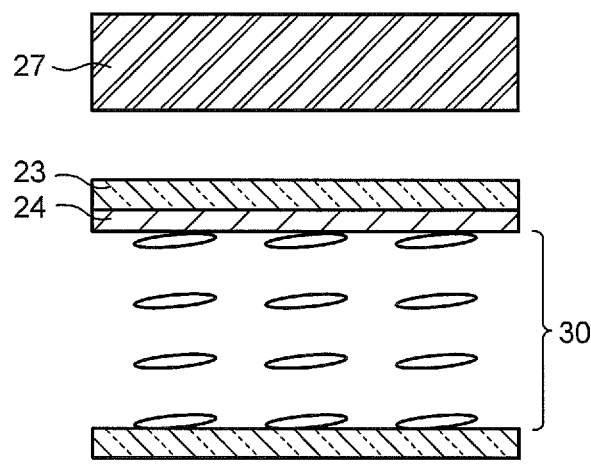
FIG.26
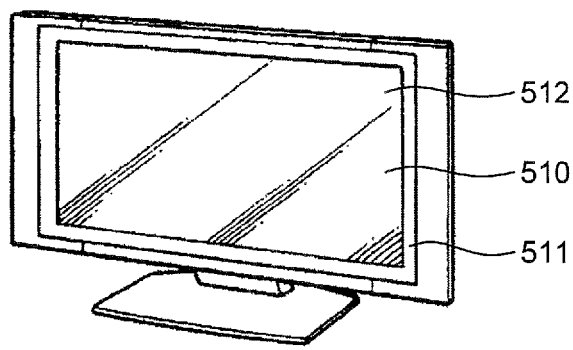

LIQUID CRYSTAL DISPLAY DEVICE AND ELECTRONIC APPARATUS

CROSS-REFERENCE TO RELATED APPLICATIONS

This application claims priority from Japanese Application No. 2013-063106, filed on Mar. 25, 2013, the contents of which are incorporated by reference herein in its entirety.

BACKGROUND

1. Technical Field

The present disclosure relates to a liquid crystal display device and an electronic apparatus including the same.

2. Description of the Related Art

Examples of a display device include, but are not limited to, a transmissive display device that performs display utilizing transmitted light of backlight from the back surface of a screen, and a reflective display device that performs display utilizing reflected light of external light. Examples of a display device having characteristics of both the transmissive display device and the reflective display device include, but are not limited to, a transflective liquid crystal display device including a transmissive display region (transmissive display part) and a reflective display region (reflective display part) in one pixel.

The reflective and transflective liquid crystal display device has a reflector that reflects light. A variation may occur in intensity of the reflected light due to patterning accuracy of the reflector or misalignment of laminated substrates. To reduce the variation, there is a technique in which a layer for scattering light is provided closer to a liquid crystal layer side than a wave plate (for example, refer to Japanese Patent Application Laid-open Publication No. 2011-64885).

The liquid crystal display device including a layer for scattering light has an increased thickness. To mount the liquid crystal display device in a portable electronic apparatus or a display device mounted on a car, the thickness of the liquid crystal display device is preferably as small as possible to meet a demand for a compact size.

SUMMARY

According to an aspect, a liquid crystal display device includes: a first substrate on which a reflective electrode is arranged for each of a plurality of pixels; a second substrate; a liquid crystal layer arranged between the first substrate and the second substrate; and a wave plate in which liquid crystals are fixed so that an alignment direction of the liquid crystals is opposite to an alignment direction of the liquid crystal layer. The wave plate is arranged on a second substrate side of the liquid crystal layer.

According to another aspect, an electronic apparatus includes the liquid crystal display device.

BRIEF DESCRIPTION OF THE DRAWINGS

FIG. 19 is a diagram illustrating an arrangement example of the ¼ wavelength plate or the ½ wavelength plate as the wave plate;

FIG. 20 is a diagram illustrating an arrangement example of the ¼ wavelength plate or the ½ wavelength plate as the wave plate;

FIG. 21 is a diagram illustrating an arrangement example of the ¼ wavelength plate or the ½ wavelength plate as the wave plate;

FIG. 22 is a diagram illustrating an arrangement example of the ¼ wavelength plate or the ½ wavelength plate as the wave plate;

FIG. 23 is a diagram illustrating an arrangement example of the ¼ wavelength plate or the ½ wavelength plate as the wave plate;

FIG. 24 is a diagram illustrating an arrangement example of the ¼ wavelength plate or the ½ wavelength plate as the wave plate;

FIG. 25 is a diagram illustrating an arrangement example of the ¼ wavelength plate or the ½ wavelength plate as the wave plate;

FIG. 26 is a diagram illustrating a television apparatus to which the transflective liquid crystal display device is applied;

DETAILED DESCRIPTION

Figure 1:
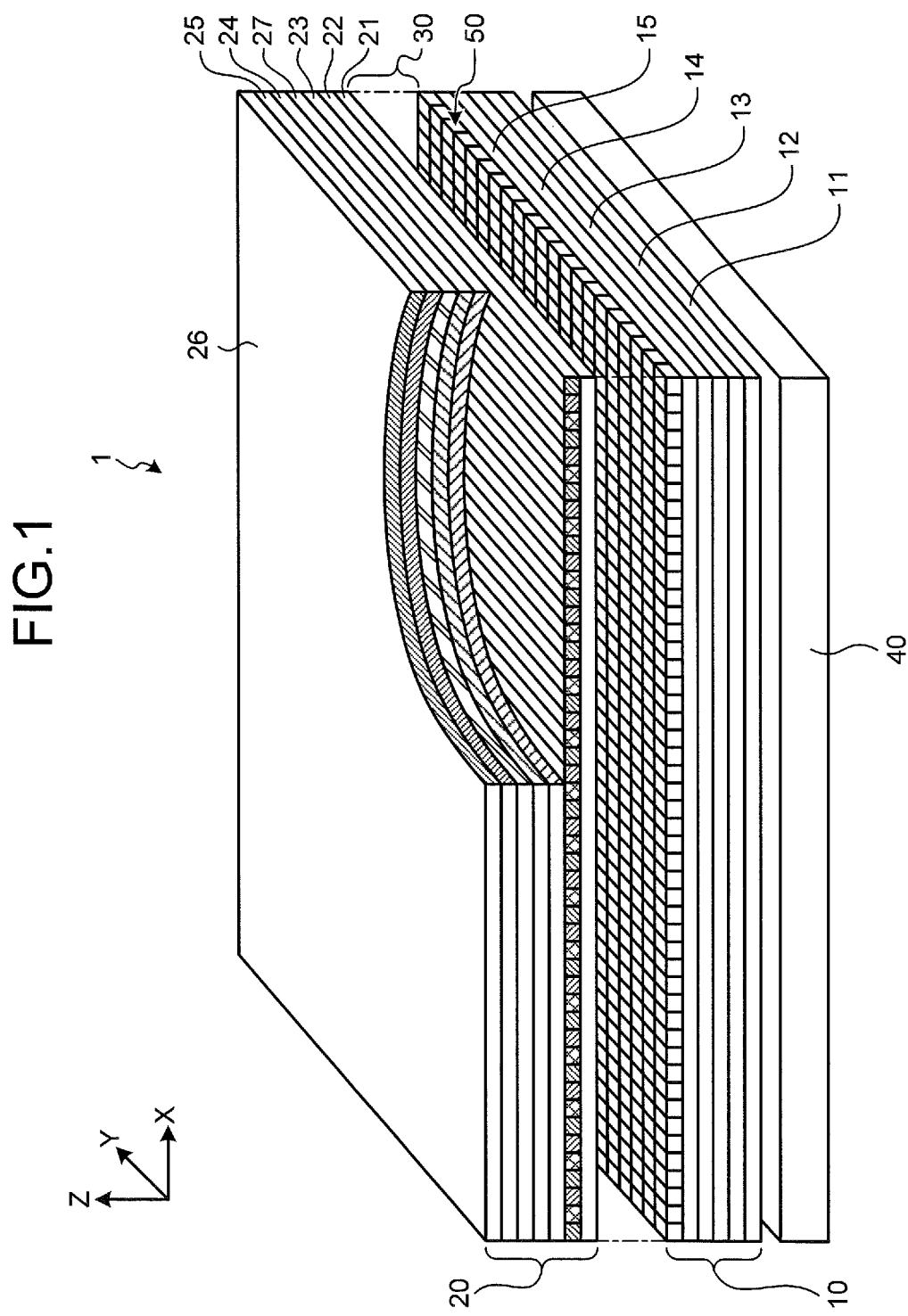
FIG. 1 is a partially cutout perspective view illustrating a schematic configuration of a transflective liquid crystal display device to which the present disclosure is applied.

The following describes modes for implementing the technique of the present disclosure (hereinafter, referred to as "embodiments") in detail with reference to the accompanying drawings in the following procedures.

1. Liquid crystal display device to which the present disclosure is applied
   1-1. Transflective liquid crystal display device for color display
   1-2. Example of pixel circuit
   1-3. Electrode structure of pixel part
   1-4. Display mode
   1-5. Scattering layer
   1-6. Wave plate
   1-7. Arrangement of wave plate
2. Electronic apparatus
3. Configuration of present disclosure 1. Liquid Crystal Display Device to which the Present Disclosure is Applied The technique of the present disclosure can be applied to a flat panel (planar) display device. Examples of the flat panel display device include, but are not limited to, a display device using a liquid crystal display (LCD) panel, and a display device using an electro luminescence (EL) display panel.

The flat panel display devices can be classified into a transmissive type, a reflective type, and a transflective type according to a display type. The technique of the present disclosure can be applied to a transmissive liquid crystal display device, a reflective liquid crystal display device, and a transflective liquid crystal display device having characteristics of both the transmissive display device and the reflective display device. The liquid crystal display device according to the present disclosure is preferably used as a display unit of an electronic apparatus, especially as a portable electronic apparatus frequently used outdoors such as a portable information apparatus (a digital camera, for example) or a portable communication apparatus (a mobile phone, for example).

The liquid crystal display device to which the present disclosure is applied may be a display device for monochromatic display or a display device for color display. In the display device for color display, one pixel (unit pixel) as a unit forming a color image includes a plurality of sub-pixels. More specifically, in the display device for color display, for example, the unit pixel includes three sub-pixels of a sub-pixel representing red (R), a sub-pixel representing green (G), and a sub-pixel representing blue (B).

The pixel is not limited to a pixel including sub-pixels of the three primary colors (RGB). For example, the unit pixel may be made by adding sub-pixels of one color or a plurality of colors to the sub-pixels of the three primary colors (RGB). More specifically, for example, the unit pixel may be made by adding a sub-pixel representing white (W) for improving luminance, or the unit pixel may be made by adding at least one sub-pixel representing a complementary color to expand the range of color reproduction.

1-1. Transflective Liquid Crystal Display Device for Color Display

The following describes a transflective liquid crystal display device for color display as an example of the liquid crystal display device to which the present disclosure is applied with reference to the drawings. The present disclosure is not limited to color display. Although not limited to the transflective liquid crystal display device, the present disclosure is especially preferable for a transflective liquid crystal display device or a reflective liquid crystal display device.

FIG. 1 is a partially cutout perspective view illustrating a schematic configuration of a transflective liquid crystal display device to which the present disclosure is applied. As illustrated in FIG. 1, this transflective liquid crystal display device 1 as the liquid crystal display device to which the present disclosure is applied includes a first panel unit 10, a second panel unit 20, a liquid crystal layer 30, and a backlight unit 40, as main components. In the transflective liquid crystal display device 1, the surface side of the second panel unit 20 is a display surface side. The first panel unit 10 and the second panel unit 20 are arranged opposite to each other with a predetermined gap therebetween. The liquid crystal layer 30 is formed by filling liquid crystal material in the gap between the first panel unit 10 and the second panel unit 20.

The first panel unit 10 includes a polarizing plate 11, a ½ wavelength plate 12, a ¼ wavelength plate 13, a first substrate 14 formed of transparent glass or the like, and a planarization film 15 in this order on the side remote from the liquid crystal layer 30, that is, the backlight unit 40 side.

In the first panel unit 10, a plurality of signal lines and a plurality of scanning lines (both are not illustrated) are formed to intersect with each other on the first substrate 14. At parts where the signal lines and the scanning lines intersect with each other, the sub-pixels (hereinafter, simply referred to as "pixels" in some cases) 50 are two-dimensionally arranged in a matrix.

Circuit elements including a switching element such as a thin film transistor (TFT) and a capacitive element are also formed on the first substrate 14 for each pixel 50. The planarization film 15 is formed on the surface of the circuit element, the signal lines, and the scanning lines to flatten the surface of the first panel unit 10. Then a reflective electrode to be described later is formed on the planarization film 15 for each pixel 50. The first substrate 14 may be referred to as a TFT substrate because the circuit elements thus formed include the TFT.

The signal lines are wiring for transmitting a signal (display signal/video signal) that drives the pixel 50, and have a wiring structure extending along the arrangement direction of pixels of a pixel column, which is the column direction (Y-direction in FIG. 1), for each pixel column of the matrix of the pixels 50. The scanning lines are wiring for transmitting a signal (scanning signal) that selects the pixel 50 for each row, and have a wiring structure extending along the arrangement direction of pixels of a pixel row, which is the row direction (X-direction in FIG. 1), for each pixel row of the matrix of the pixels 50. The X-direction and the Y-direction are orthogonal to each other.

The second panel unit 20 includes a transparent electrode 21 formed of indium tin oxide (ITO) or the like, a color filter 22, a second substrate 23 formed of transparent glass or the like, a scattering layer 27, a ¼ wavelength plate 24, a ½ wavelength plate 25, and a polarizing plate 26 arranged in this order from the liquid crystal layer 30 side.

In the second panel unit 20, the color filter 22 has a configuration in which respective stripe-shaped filters of R (red), G (green), and B (blue) extending in the column direction (Y-direction) for example are repeatedly arranged at a pitch same as the pitch of the pixel 50 in the row direction (X-direction). The second substrate 23 may be referred to as a CF substrate because it includes the color filter (CF) 22.

A transflective liquid crystal display panel includes the first panel unit 10, the second panel unit 20 opposed to the first panel unit 10, and the liquid crystal layer 30 arranged between the first panel unit 10 and the second panel unit 20. The upper surface (front surface) of the second panel unit 20 is a display surface.

The backlight unit 40 is an illumination unit that illuminates the liquid crystal display panel from the back surface side thereof, that is, the side opposed to the liquid crystal layer 30 of the first panel unit 10. The backlight consists of well-known members such as a light emitting diode (LED) or a fluorescent tube as a light source, a prism sheet, a diffusion sheet, and a light-guiding plate. However, the members for the back light are not limited to them.

In the transflective liquid crystal display device 1 having the above structure, each of the pixels 50 includes a reflective display region (reflective display part) and a transmissive display region (transmissive display part). As described above, the reflective display region includes the reflective electrode formed for each pixel 50 on the surface of the planarization film 15. The reflective electrode reflects external light incident from the outside through the second panel unit 20 to be used for display. The transmissive display region transmits light from the backlight unit 40 and performs display using the transmitted light. Details of the transmissive display region provided for each pixel 50 will be described later.

1-2. Example of Pixel Circuit

Figure 2:
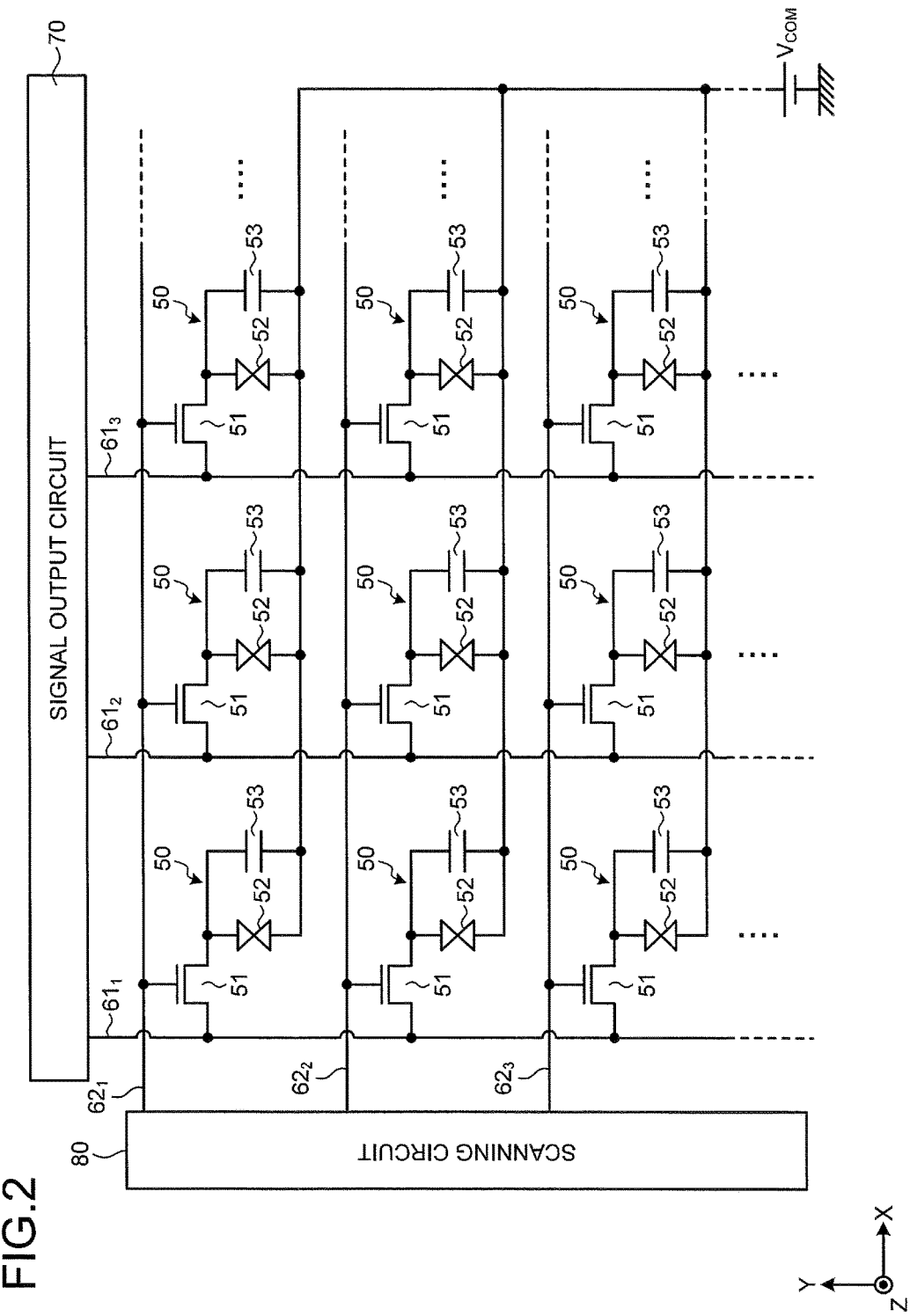
FIG. 2 is a diagram illustrating an example of a pixel circuit.

FIG. 2 is a diagram illustrating an example of a pixel circuit. An example of the pixel circuit of the pixel 50 will be described with reference to FIG. 2. The direction indicated by "X" in FIG. 2 (X-direction) indicates the row direction of the transflective liquid crystal display device 1 illustrated in FIG. 1, and the direction indicated by "Y" (Y-direction) in FIG. 2 indicates the column direction in FIG. 1.

As illustrated in FIG. 2, a plurality of signal lines 61 ($61_1$, $61_2$, $61_3$, ...) are arranged orthogonally to a plurality of scanning lines 62 ($62_1$, $62_2$, $62_3$, ...), and the pixels 50 are arranged at intersection parts thereof. The scanning lines 62 ($62_1$, $62_2$, $62_3$, ...) extend in the row direction (X-direction), and the signal lines 61 ($61_1$, $61_2$, $61_3$, ...) extend in the column direction (Y-direction). As described above, the signal lines 61 and the scanning lines 62 are formed on a surface of the first substrate (TFT substrate) 14 of the first panel unit 10. One end of each of the signal lines 61 ($61_1$, $61_2$, $61_3$, ...) is coupled to a corresponding output of a signal output circuit 70, and one end of each of the scanning lines 62 ($62_1$, $62_2$, $62_3$, ...) is coupled to a corresponding output of a scanning circuit 80.

For example, the pixel 50 includes a pixel transistor 51 employing a thin film transistor (TFT), a liquid crystal capacitor 52, and a holding capacitor 53. The gate electrode of the pixel transistor 51 is coupled to the scanning line 62 ($62_1$, $62_2$, $62_3$, ...), and the source electrode of the pixel transistor 51 is coupled to the signal line 61 ($61_1$, $61_2$, $61_3$, ...).

The liquid crystal capacitor 52 means a capacity component of liquid crystal material generated between a pixel electrode and a counter electrode formed opposite thereto (corresponding to the transparent electrode 21 in FIG. 1), and the pixel electrode is coupled to the drain electrode of the pixel transistor 51. In color display, the pixel electrode corresponds to the reflective electrode formed for each sub-pixel, whereas in monochromatic display, the pixel electrode corresponds to the reflective electrode formed for each pixel. The direct current voltage at a common potential $V_{COM}$ is applied to the counter electrode of the liquid crystal capacitor 52 in each of the pixels. One electrode of the holding capacitor 53 is coupled to the pixel electrode of the liquid crystal capacitor 52, and the other electrode of the holding capacitor 53 is coupled to the counter electrode of the liquid crystal capacitor 52.

As is clear from the pixel circuit described above, the signal lines 61 ($61_1$, $61_2$, $61_3$, ...) are wiring that transmits a signal for driving the pixel 50, which is a video signal output from the signal output circuit 70, the pixels 50 in each pixel column. The scanning lines 62 ($62_1$, $62_2$, $62_3$, ...) are wiring that transmits a signal for selecting the pixels 50 for each row, which is the scanning signal output from the scanning circuit 80 for each pixel row.

1-3. Electrode Structure of Pixel Part

Figure 3:
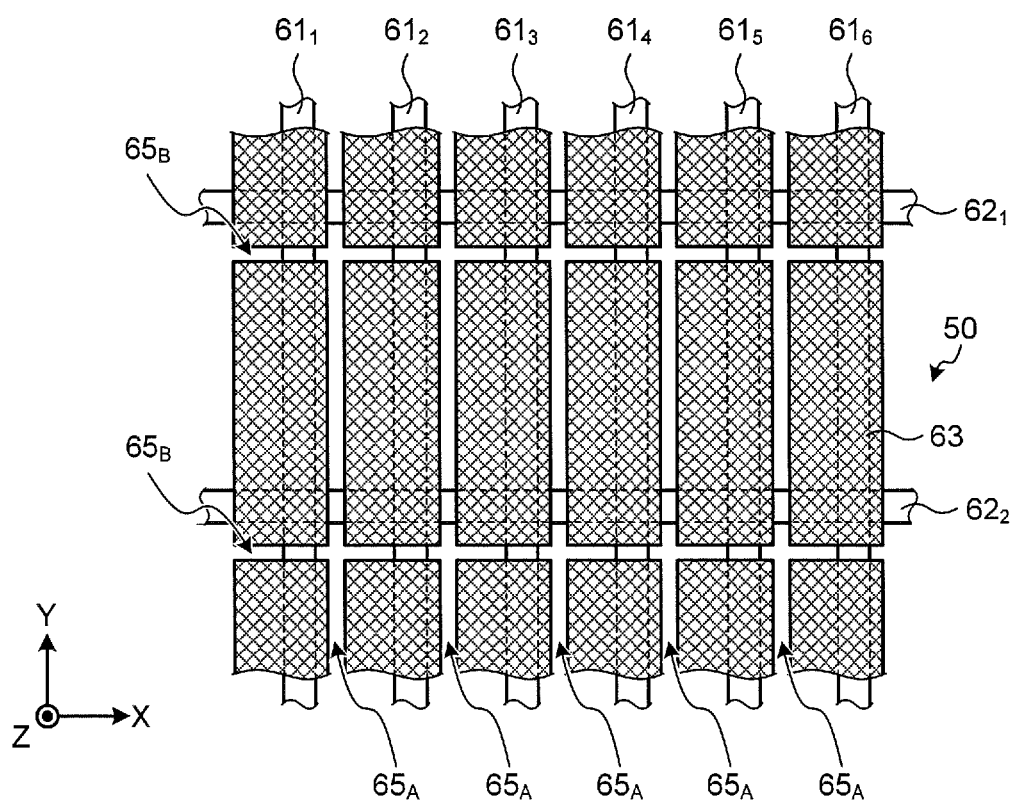
FIG. 3 is a plan view illustrating the electrode structure of a pixel part according to an embodiment.

FIG. 3 is a plan view illustrating the electrode structure of a pixel part according to an embodiment. The transflective liquid crystal display device 1 performs transmissive display using a space between the pixels 50 of a reflective electrode 63 while maintaining reflection display performance equivalent to that of the reflective display device. Specifically, as illustrated in FIG. 3, the wiring of signal lines 61, scanning lines 62, and the like is formed so as not to block the space between the pixels 50 of the reflective electrode 63 in the pixel part in which the pixels 50 are arranged in a matrix. Accordingly, the transmissive display can be performed using the space as the transmissive display region.

In FIG. 3, the reflective electrode 63 is illustrated by hatching. The space between the pixels 50 of the reflective electrode 63 includes a space $65_A$ extending along the arrangement direction of the pixels of the pixel column, which is the column direction (Y-direction illustrated in FIG. 3), and a space $65_B$ extending along the arrangement direction of the pixels of the pixel row, which is the row direction (X-direction illustrated in FIG. 3). The present example illustrates the signal line 61 and the scanning line 62 as the wiring formed in the pixel part. However, the wiring formed in the pixel part is not limited thereto. That is, all driving lines (control lines) required for driving (controlling) the pixel 50 are the wiring according to the example.

The phrase "not to block the space" does not exclude a case in which there is a region where the wiring overlaps with the spaces $65_A$ and $65_B$ between the pixels 50 of the reflective electrode 63. Specifically, the concept of "not to block the space" includes a state in which the signal line 61 wired in the column direction overlaps with the space $65_B$ extending in the row direction, and a state in which the scanning line 62 wired in the row direction overlaps with the space $65_A$ extending in the column direction.

The concept of "not to block the space" also includes a state in which the signal line 61 partly or partially overlaps with the space $65_A$ extending in the column direction, and a state in which the scanning line 62 partly or partially overlaps with the space $65_B$ extending in the row direction. In both cases, a region where the signal line 61 and the scanning line 62 do not overlap with the spaces $65_A$ and $65_B$, respectively, is used as the transmissive display region.

Not to block the spaces $65_A$ and $65_B$ between the pixels 50 of the reflective electrode 63, the wiring is preferably formed away from the spaces $65_A$ and $65_B$ between the pixels 50 of the reflective electrode 63. The phrase "away from the spaces" means a state in which wiring does not entirely cover the spaces $65_A$ and $65_B$ between the pixels 50 of the reflective electrode 63 (that is, there is no region where the wiring entirely overlaps with the spaces $65_A$ and $65_B$).

Specifically, as illustrated in FIG. 3, the signal line 61 is preferably wired away from the space $65_A$ extending in the column direction, that is, having no region (portion) entirely overlapping with the space $65_A$. The scanning line 62 is preferably wired away from the space $65_B$ extending in the row direction, that is, having no region entirely overlapping with the space $65_B$. The entire regions of the spaces $65_A$ and $65_B$ can be used as the transmissive display region because there is no region entirely overlapping with the signal line 61 and the scanning line 62 in the spaces $65_A$ and $65_B$ between the pixels 50 of the reflective electrode 63, so that the transflective liquid crystal display device 1 can obtain higher transmissive display performance.

As described above, the transflective liquid crystal display device 1 performs transmissive display using the space between the pixels 50 of the reflective electrode 63, that is, the space is used as the transmissive display region. Accordingly, it is not necessary to separately secure the transmissive display region in the pixel 50. In this way, as is clear from FIG. 3, the dimensions of individual pieces of the reflective electrode 63 are equivalent to the dimensions of those of the reflective liquid crystal display device when the pixels 50 have the same size in the transflective liquid crystal display device 1. As a result, the transflective liquid crystal display device 1 can achieve transmissive display while maintaining the reflection display performance equivalent to that of the reflective display device.

1-4. Display Mode

The display mode of the liquid crystal includes a normally white mode in which white is displayed when an electric field (voltage) is not applied and black is displayed when the electric field is applied, and a normally black mode in which black is displayed when the electric field is not applied and white is displayed when the electric field is applied. In both modes, the liquid crystal cell has the same structure, and has different arrangements of the polarizing plates 11 and 26 in FIG. 1.

When transmissive display is performed using the space between the pixels 50 of the reflective electrode 63, not all of liquid crystal molecules between the pixels are switched, leaving a region where the liquid crystal molecules do not move. In the normally white mode, black cannot be distinctly displayed because of the region where the liquid crystal molecules do not move, so that contrast may be reduced.

Figure 4:
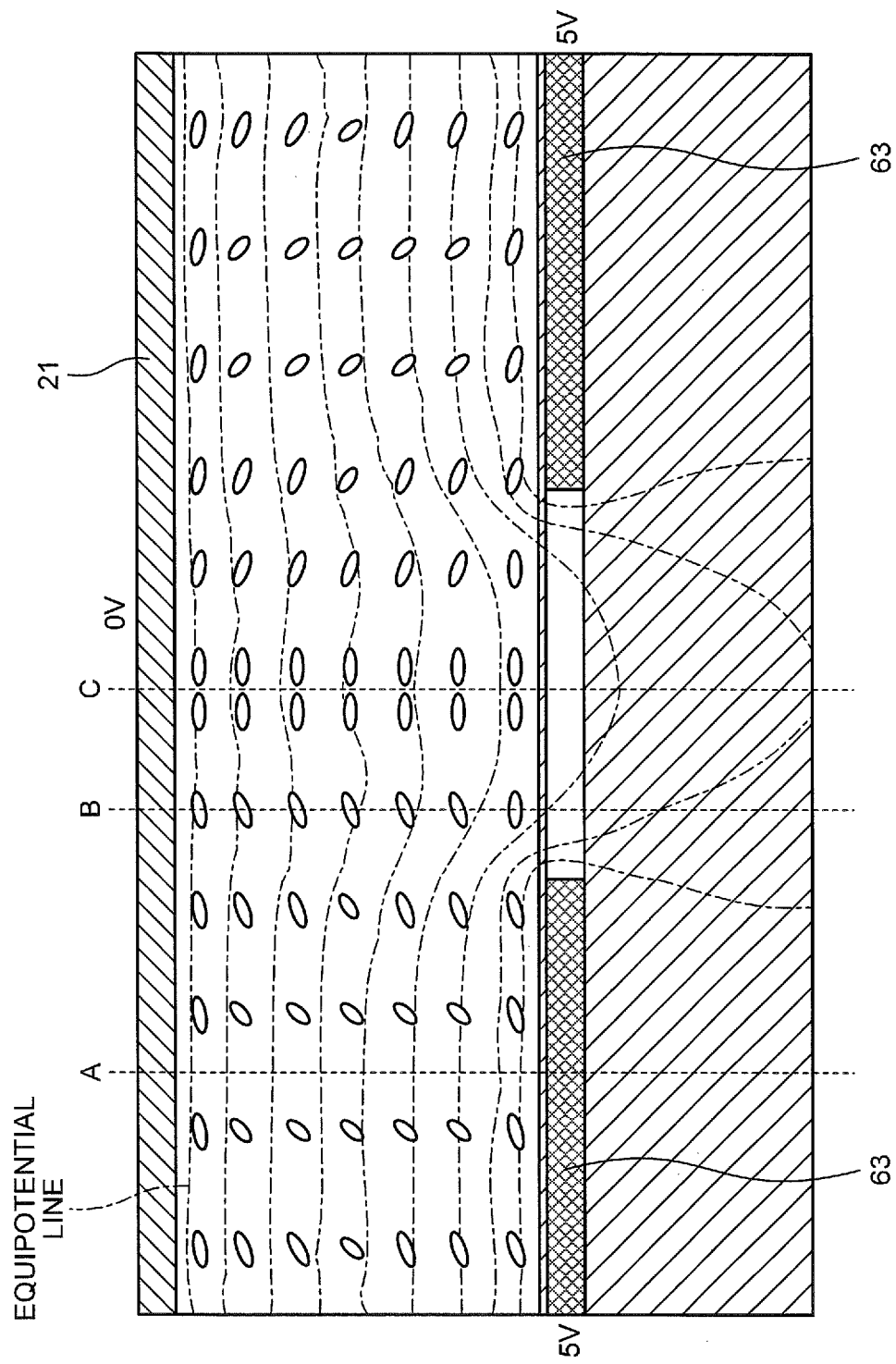
FIG. 4 is a diagram illustrating movement of liquid crystal molecules between pixels when transmissive display is performed using a space between the pixels of a reflective electrode.

FIG. 4 is a diagram illustrating movement of the liquid crystal molecules between the pixels when transmissive display is performed using the space between the pixels of the reflective electrode. In FIG. 4, the liquid crystal molecules are completely moved at the position A in the central part of the reflective electrode 63. In contrast, the liquid crystal molecules are moved to some extent at the position B in the vicinity of the reflective electrode 63 between the pixels, and the liquid crystal molecules are not moved at all at the position C in the central part between the pixels. With this configuration, transmittance is significantly higher in the region in the central part between the pixels where the liquid crystal molecules are not moved at all, than in the region of the reflective electrode 63, so that light leakage occurs. Accordingly, black is not distinctly displayed and the contrast is reduced.

Figure 5:
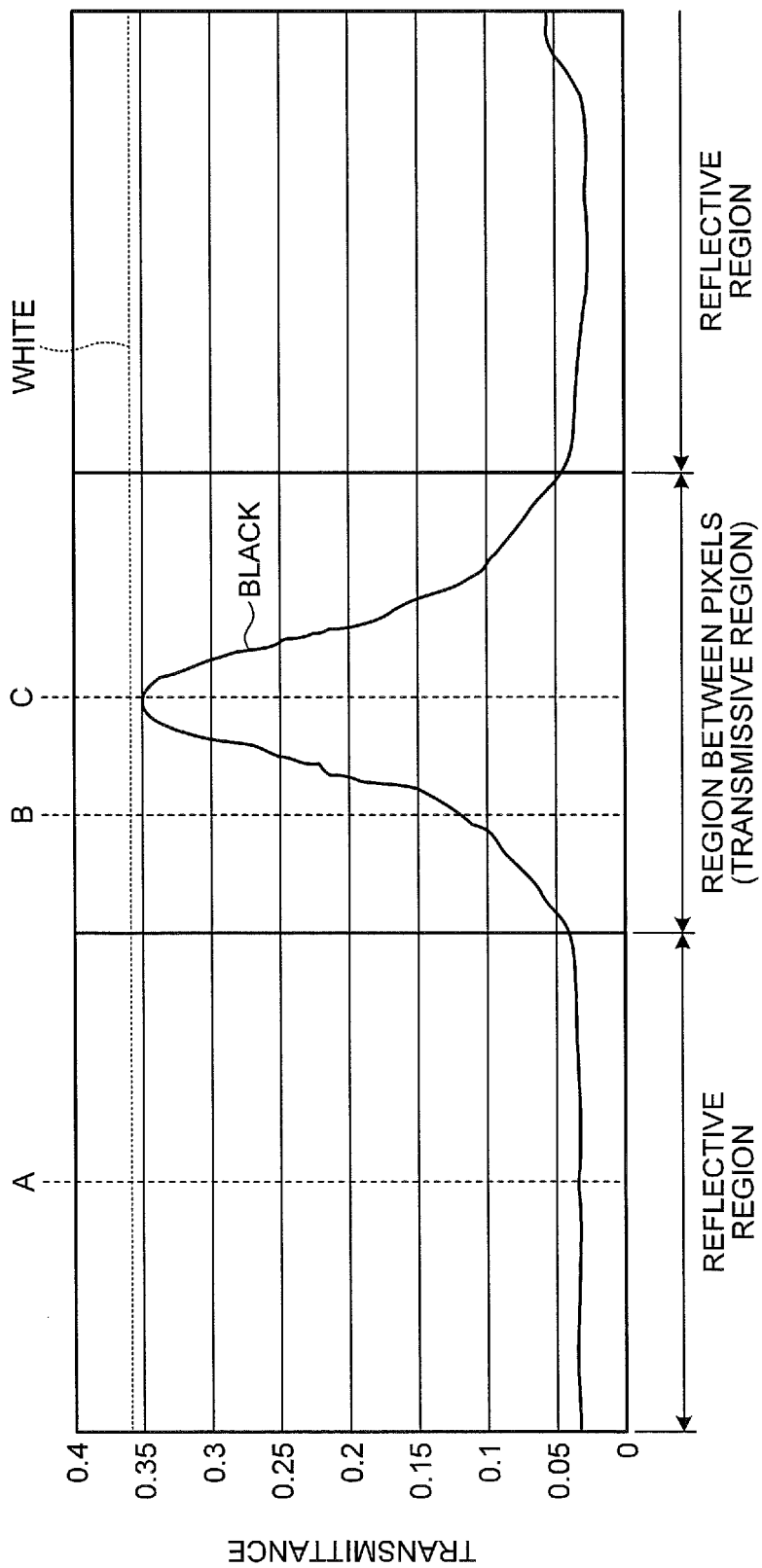
FIG. 5 is a diagram illustrating a simulation result of transmittance between the pixels in a normally white mode.

FIG. 5 is a diagram illustrating a simulation result of the transmittance between the pixels in the normally white mode. The positions A, B, and C in FIG. 5 correspond to the positions A, B, and C in FIG. 4, respectively. It is understood from the simulation result in FIG. 5 that the transmittance is high (for example, about 0.35) at the position C in the central part between the pixels in FIG. 4 because the liquid crystal molecules are not moved at all.

Therefore, the normally black mode is preferably employed as the display mode of the transflective liquid crystal display device according to the present embodiment. In the normally black mode, black is displayed in a state in which voltage is not applied to the liquid crystal, that is, a state in which liquid crystal alignment is uniform, so that black can be distinctly displayed and the contrast can be increased. However, this does not exclude the normally white mode.

As an example of the measurement result of optical characteristics, in the normally white mode, white transmittance (%) is about 0.93, black transmittance (%) is about 0.29, so that the contrast is about 3. In the normally black mode, the white transmittance (%) is about 0.71, the black transmittance (%) is about 0.06, so that the contrast is about 12. That is, by employing the normally black mode, the contrast can be improved to four times larger than that in the normally white mode.

1-5. Scattering Layer

Figure 6:
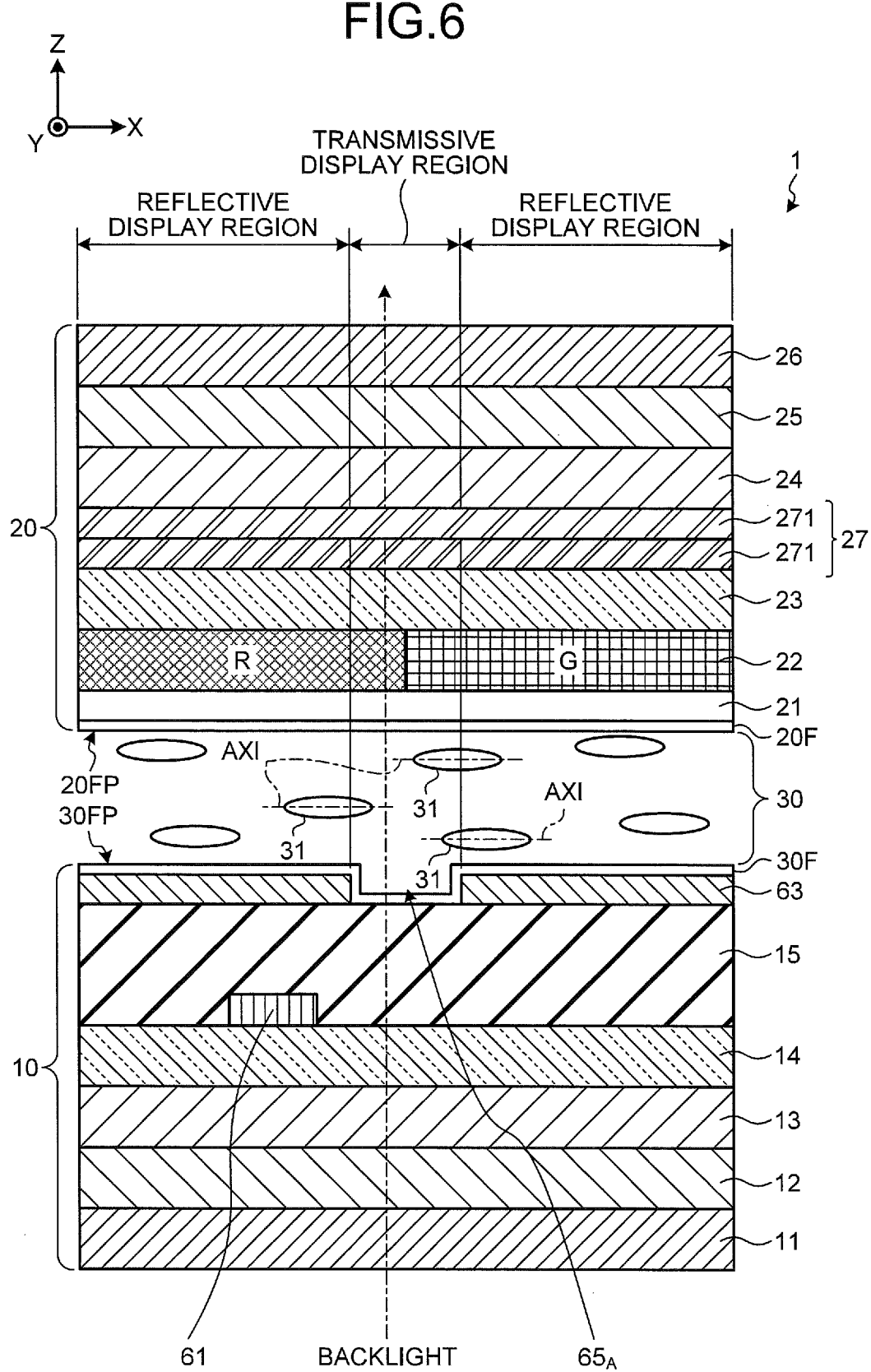
FIG. 6 is a cross-sectional view illustrating a transflective liquid crystal display device to which the present disclosure is applied.

FIG. 6 is a cross-sectional view illustrating the transflective liquid crystal display device to which the present disclosure is applied. As illustrated in FIG. 6, the scattering layer 27, the ¼ wavelength plate 24 as a wave plate, the ½ wavelength plate 25 as a wave plate, and the polarizing plate 26 are arranged in this order on the opposite side of the second substrate 23 to the color filter 22. The scattering layer 27 is provided in the traveling direction of light reflected by the reflective electrode 63. The scattering layer 27 is an anisotropic or isotropic layer that scatters light reflected by the reflective electrode 63 and backlight transmitted through the space $65_A$ between the pixels. The scattering layer 27 includes two light scattering films 271. The two light scattering films 271 are laminated in a direction away from the second substrate 23. The light scattering film 271 may have one layer or three or more layers. It is preferable that the light scattering film 271 has a plurality of layers because the diffusion range of light can be expanded and iridescence can be more securely reduced.

Figure 7:
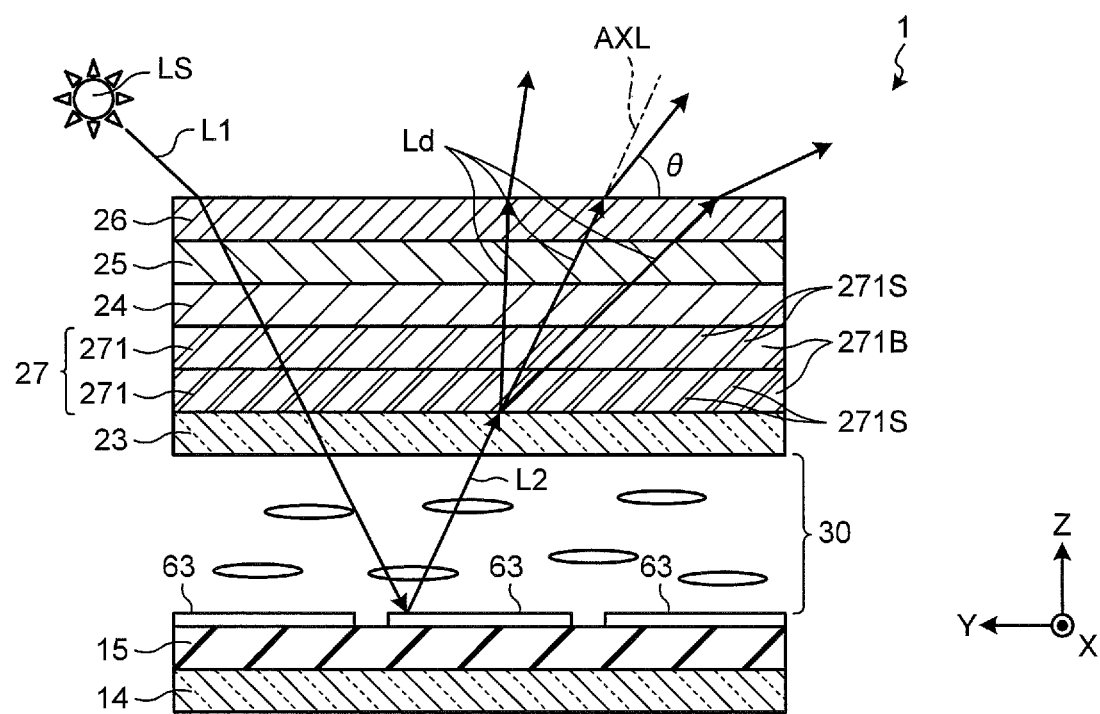
FIG. 7 is a cross-sectional view illustrating an example of a light scattering film.
Figure 8:
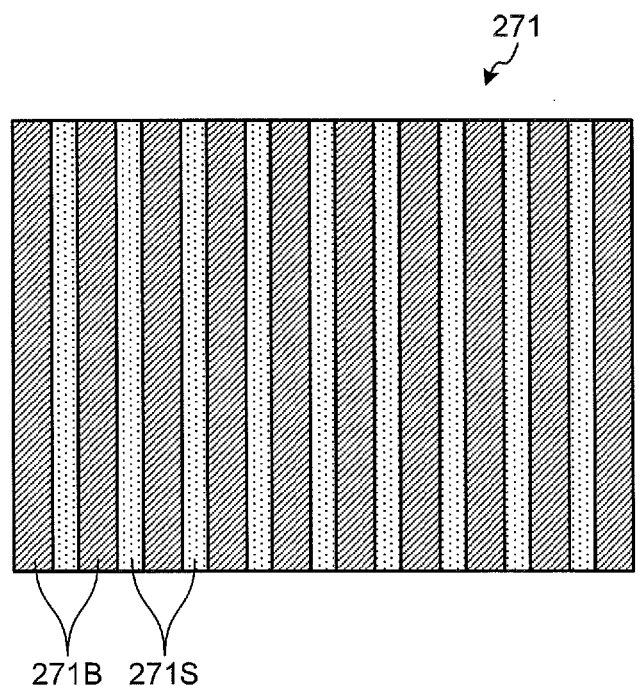
FIG. 8 is a plan view illustrating the example of the light scattering film.
Figure 9:
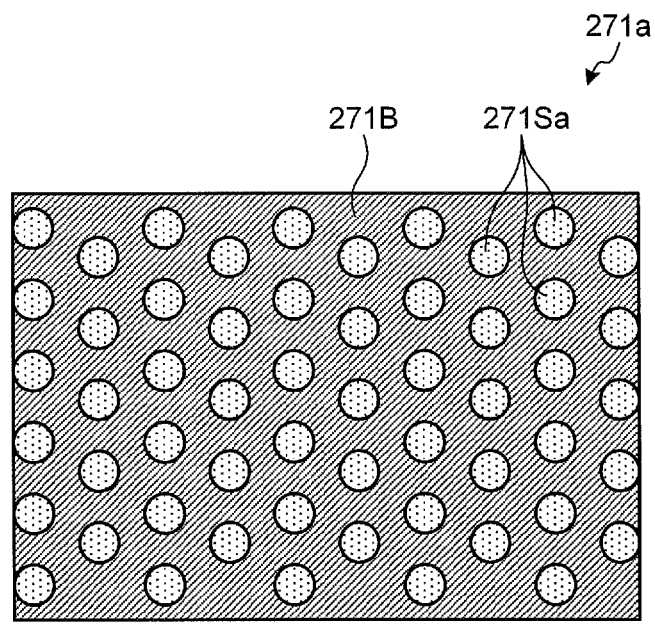
FIG. 9 is a plan view illustrating a modification of the light scattering film.

FIG. 7 is a cross-sectional view illustrating an example of the light scattering film, FIG. 8 is a plan view illustrating the example of the light scattering film, and FIG. 9 is a plan view illustrating a modification of the light scattering film. For example, a light control film (LCF) may be used as the light scattering film 271. The light scattering film 271 is a forward scattering layer that largely scatters light forward and scarcely scatters light backward. The light scattering film 271 is an anisotropic scattering film that scatters light incident from a specific direction. When light is incident from a specific direction on the polarizing plate 26 side with respect to the second substrate 23, the light scattering film 271 transmits the incident light almost without scattering, and largely scatters the returned light reflected by the reflective electrode 63.

For example, as illustrated in FIG. 7, the light scattering film 271 transmits external light L1 incident from a light emitting body LS (for example, illumination or the sun) in a predetermined direction with respect to the second substrate 23, and scatters light L2 thus transmitted and reflected by the reflective electrode 63 (reflected light) within a predetermined range around a scattering center axis AXL. The external light L1 is parallel light incident on the polarizing plate 26 of the second substrate 23. The external light L1 may be unpolarized light or polarized light. For example, as illustrated in FIG. 7, the light scattering film 271 includes two types of regions (a first region 271B and a second region 271S) having different refractive indexes. The light scattering film 271 may have a louver structure in which a plurality of plate-shaped second regions 271S are arranged at predetermined intervals in the first region 271B as illustrated in FIG. 8, or may have a pillar-shaped structure in which pillar-shaped second regions 271Sa are arranged in the first region 271B like a light scattering film 271a illustrated in FIG. 9.

For example, in the light scattering film 271, the first region 271B and the second region 271S extend in the thickness direction and incline in a predetermined direction. For example, the light scattering film 271 is formed by obliquely irradiating a resin sheet with ultraviolet rays, the resin sheet being a composite of two or more types of photopolymerizable monomer or oligomer of which refractive indexes are different from each other. The light scattering film 271 may have a different structure from the above, and may be manufactured in a method different from the above. In a case in which the scattering layer 27 includes the light scattering films 271, the light scattering films 271 may have the same structure or may have different structures from each other.

The scattering center axis AXL of the light scattering film 271 is preferably oriented, for example, toward the direction of a main visual angle θ (main visual angle direction) of the transflective liquid crystal display device 1 illustrated in FIG. 1. The scattering center axis AXL may be oriented toward a direction different from the main visual angle direction. In both cases, the orientation of the scattering center axis AXL may be set so that luminance in the main visual angle direction is the brightest, that is, the reflectivity in the direction is the highest due to the light scattering film 271, when the light scattering film 271 is used. The main visual angle θ corresponds to a direction from which a user of the transflective liquid crystal display device 1 views a video display surface when using the transflective liquid crystal display device 1. For example, when the video display surface has a rectangular shape, the main visual angle direction corresponds to a direction orthogonal to a side closest to the user among the sides of the video display surface.

When the backlight or the reflected light is transmitted through the space $65_A$ between the pixels, a variation in the transmission of the backlight or the reflected light may increase due to the patterning accuracy of the reflective electrode 63 or misalignment with respect to the second substrate 23. Especially, when silver is used for the reflective electrode 63 through a wet process, the variation described above may significantly increase. When the scattering layer 27 including the light scattering film 271 is used, the transmitted light is scattered, so that it is advantageous that the variation described above is leveled.

1-6. Wave Plate

Figure 10:
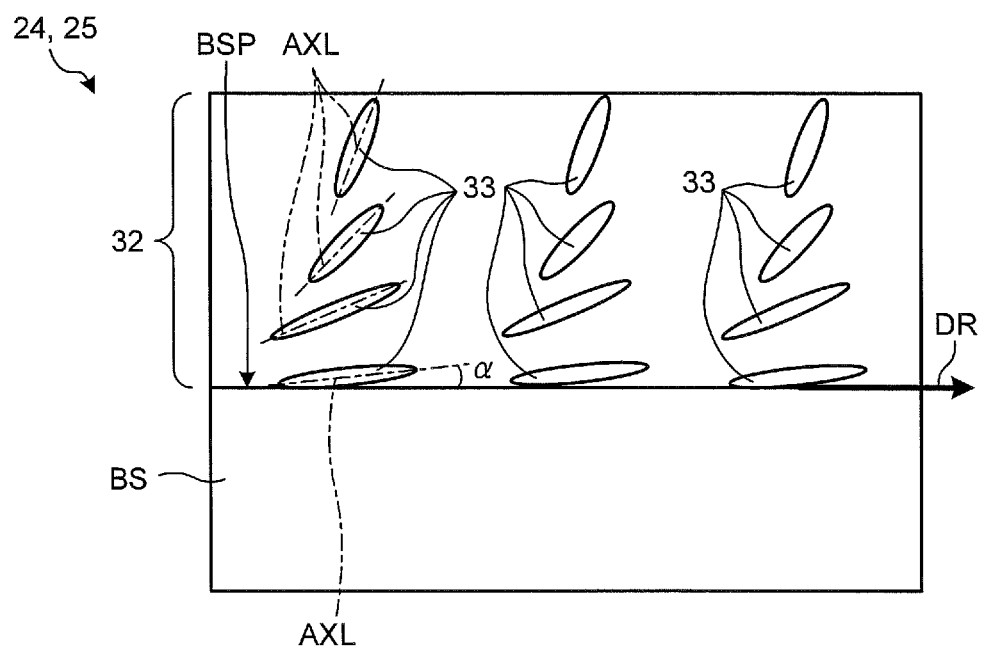
FIG. 10 is a diagram illustrating the structure of a wave plate.

FIG. 10 is a diagram illustrating the structure of the wave plate. In the present embodiment, at least one of the ½ wavelength plate 25 and the ¼ wavelength plate 24 as a wave plate is a wave plate in which liquid crystals (liquid crystal molecules 33) are fixed. Hereinafter, such a wave plate is referred to as a liquid crystal wave plate as appropriate. For example, the liquid crystal wave plate is made by performing alignment processing on a surface BSP of base material BS such as triacetyl cellulose (TAC), applying liquid crystal material on the surface on which the alignment processing is performed, and fixing the liquid crystal molecules 33 to the base material BS through crosslinking with ultraviolet rays or heat. The phase difference of the liquid crystal wave plate is determined according to Δn of the liquid crystal molecules 33 and the thickness (several micrometers) of a liquid crystal layer 32. The liquid crystal used for the liquid crystal wave plate may be nematic liquid crystals or cholesteric liquid crystals.

The liquid crystal molecules 33 tend to be hybrid-aligned such that the molecules are horizontally aligned just above the base material BS and have a larger tilt angle α farther away from it. However, the alignment of the liquid crystal wave plate is not limited to the hybrid alignment in the present embodiment. For example, the alignment of the liquid crystal wave plate may be a horizontal alignment in which the tilt angle α is 0 or substantially 0. The tilt angle α of the liquid crystal molecule 33 is an angle formed by a major axis AXL of the liquid crystal molecule 33 and the surface of the base material BS (surface BSP) on which the alignment processing is performed. The thickness of the liquid crystal layer 32 of the liquid crystal wave plate is several micrometers and thus can be smaller than in a case of using a wave plate in which a phase difference is generated by stretching a resin film (hereinafter, referred to as a stretch-type wave plate as appropriate). Accordingly, increase in the thickness of the transflective liquid crystal display device 1 can be reduced by using the liquid crystal wave plate.

Figure 11:
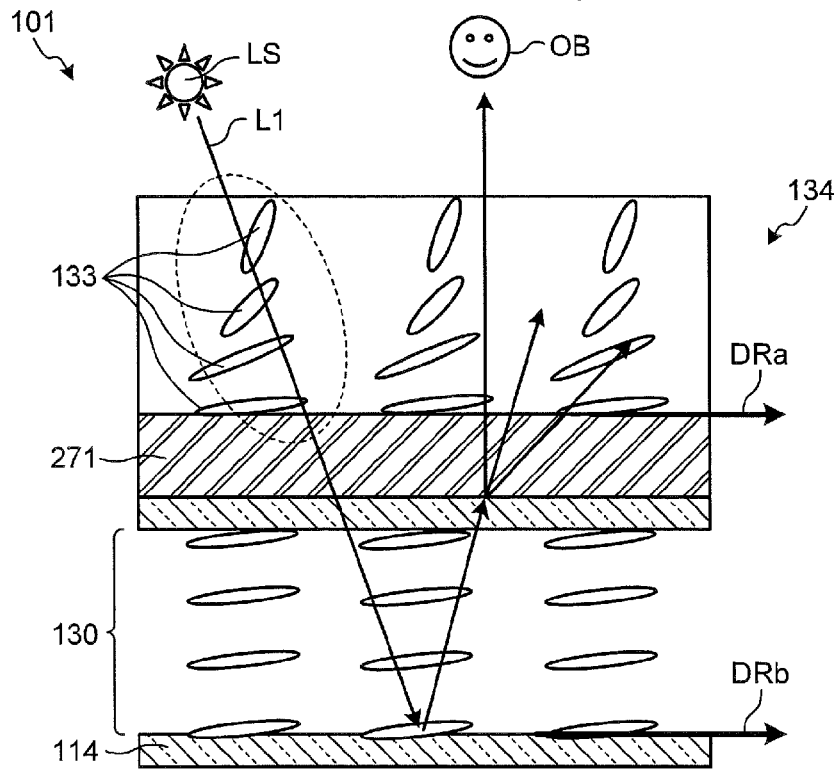
FIG. 11 is a diagram illustrating a transflective liquid crystal display device according to a comparative example.
Figure 12:
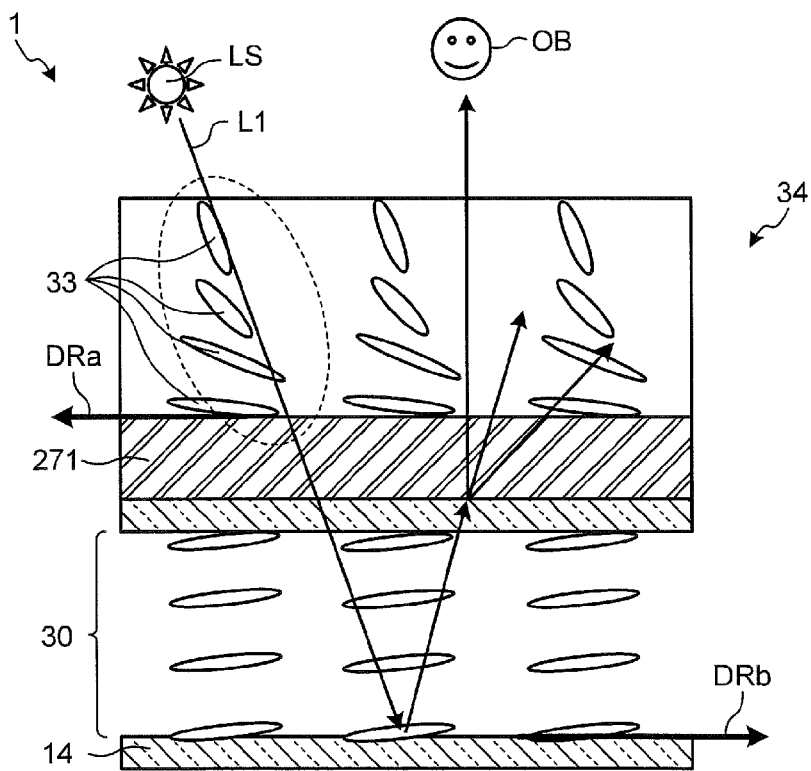
FIG. 12 is a diagram illustrating a transflective liquid crystal display device according to the present embodiment.

FIG. 11 is a diagram illustrating a transflective liquid crystal display device according to a comparative example. FIG. 12 is a diagram illustrating the transflective liquid crystal display device according to the present embodiment. The alignment direction DRa of this liquid crystal wave plate 134 included in a transflective liquid crystal display device 101 illustrated in FIG. 11 is the same as the alignment direction DRb of a liquid crystal layer 130 on a first substrate 114 side. Contrast is low in the transflective liquid crystal display device 101 including the liquid crystal wave plate 134 as compared to a case of the device including the stretch-type wave plate, so that an edge of black display may be ambiguous when visually recognized by a user OB of the transflective liquid crystal display device 101. This is because the alignment direction DRa of the liquid crystal wave plate 134 and the alignment direction DRb on the first substrate 114 side are the same and thus a phase change is large in the external light L1 incident on the liquid crystal wave plate 134 from a light emitting body LS.

The alignment direction DRa of a liquid crystal wave plate 34 included in the transflective liquid crystal display device 1 illustrated in FIG. 12 is opposite to the alignment direction DRb of the liquid crystal layer 30 on the first substrate 14 side. In the transflective liquid crystal display device 1 including the liquid crystal wave plate 34, a phase change is small in the external light L1 incident on the liquid crystal wave plate 34 from the light emitting body LS. Accordingly, the transflective liquid crystal display device 1 can obtain contrast substantially the same as that of the stretch-type wave plate. As a result, in the transflective liquid crystal display device 1, the edge of black display visually recognized by the user OB is sharpened and high display quality can be obtained.

Figure 13:
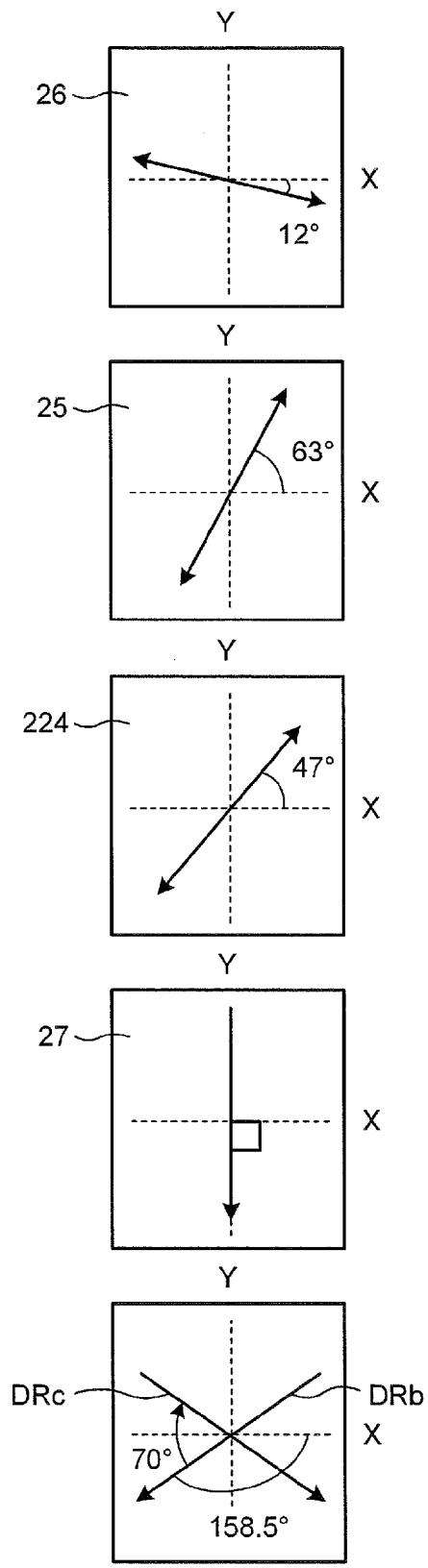
FIG. 13 is a diagram illustrating an example of performing optical design using a stretch-type wave plate.
Figure 14:
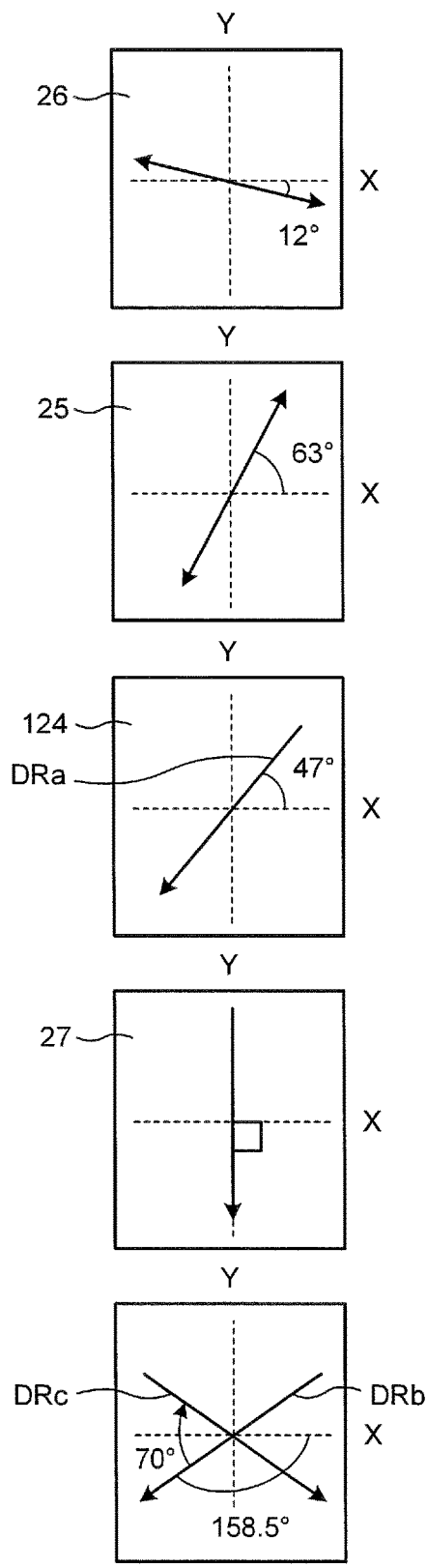
FIG. 14 is a diagram illustrating an example of performing optical design using a liquid crystal wave plate.
Figure 15:
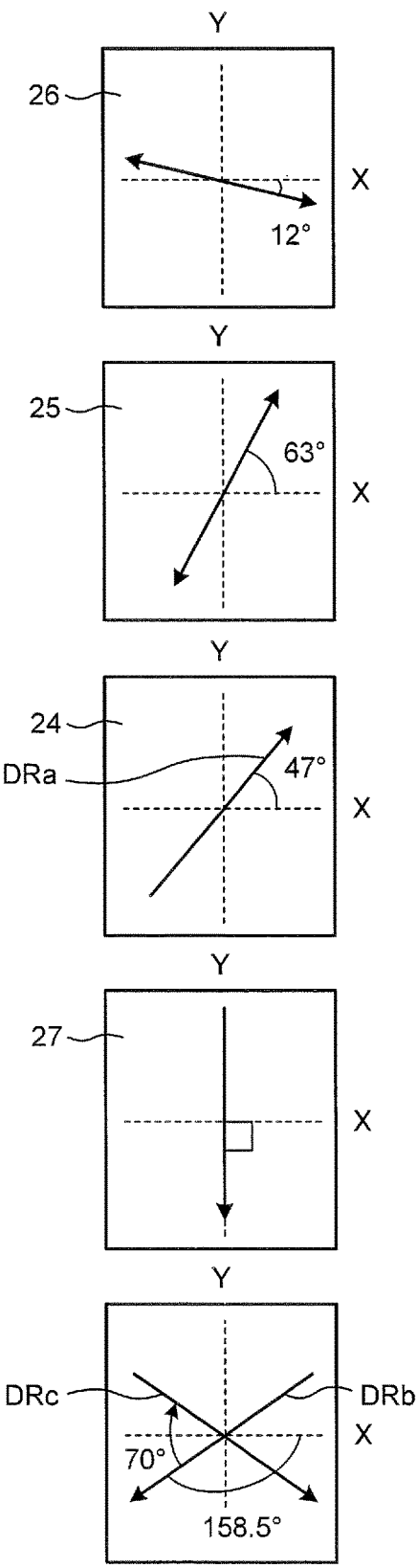
FIG. 15 is a diagram illustrating an example of performing optical design using the liquid crystal wave plate.

FIG. 13 is a diagram illustrating an example of performing optical design using the stretch-type wave plate. FIG. 14 and FIG. 15 are diagrams illustrating an example of performing optical design using the liquid crystal wave plate. The example illustrated in FIG. 14 corresponds to the optical design of the transflective liquid crystal display device 101 illustrated in FIG. 12, and the example illustrated in FIG. 15 corresponds to the optical design of the transflective liquid crystal display device 1 illustrated in FIG. 13. FIG. 13 to FIG. 15 illustrate the axial directions of the constituent members of the liquid crystal cell and the second panel unit. Specifically, they illustrate the following: the alignment direction DRb of the liquid crystal cell on the TFT substrate side; the alignment direction DRc of the liquid crystal cell on the CF substrate side; the scattering center axis direction of the scattering layer 27; the stretching axis direction of a ¼ wavelength plate 224 as a stretch-type wave plate; the alignment direction DRa of a ¼ wavelength plates 124 and 24 as a liquid crystal wave plate; the stretching axis direction of the ½ wavelength plate 25 as a stretch-type wave plate, and the absorption axis direction of the polarizing plate 26.

Contrast is 23.6 for the transflective liquid crystal display device on which optical design is performed as illustrated in FIG. 13 when viewed from the main visual angle direction, and contrast is 19.4 when viewed from the direction opposite to the main visual angle direction by 180°. Contrast is 14.8 for the transflective liquid crystal display device on which optical design is performed as illustrated in FIG. 14 when viewed from the main visual angle direction, and contrast is 22.9 when viewed from the direction opposite to the main visual angle direction by 180°. Contrast is 23.2 for the transflective liquid crystal display device on which optical design is performed as illustrated in FIG. 15 when viewed from the main visual angle direction, and the contrast is 12.4 when viewed from the direction opposite to the main visual angle direction by 180°. As is understood from the above result, contrast can be obtained equivalent to that in a case of using the stretch-type wave plate as illustrated in FIG. 13 by aligning the alignment direction DRa of the ¼ wavelength plate 24 as a liquid crystal wave plate opposite to the alignment direction DRb of the liquid crystal layer of a liquid crystal panel. In the present embodiment, contrast is calculated by dividing the reflectivity of white display by the reflectivity of black display. Reflectivity is calculated from measured light that is incident from a direction of which azimuth is opposite to the main visual angle direction by 180° and of which polar angle is −30° and that is reflected toward a direction of which polar angle is 0°.

Figure 16:
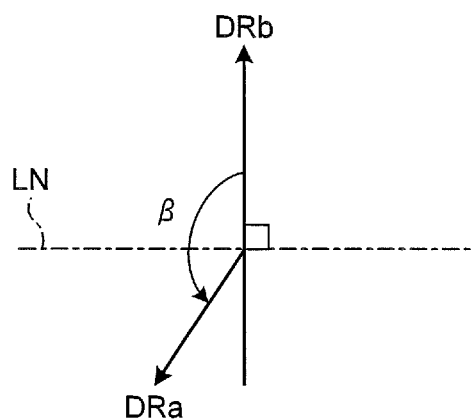
FIG. 16 is a diagram illustrating the relation between the alignment direction of the liquid crystal wave plate and the alignment direction of a liquid crystal layer included in the transflective liquid crystal display device.

FIG. 16 is a diagram illustrating the relation between the alignment direction of the liquid crystal wave plate and the alignment direction of a liquid crystal layer included in the transflective liquid crystal display device. In the present embodiment, the opposite side to the alignment direction DRb of the liquid crystal layer 30 of the transflective liquid crystal display device 1 illustrated in FIG. 1 means the opposite side to a side to which the alignment direction DRb points, with a straight line LN orthogonal to the alignment direction DRb as a boundary. As illustrated in FIG. 16, the alignment direction DRa of the ¼ wavelength plate 24 as a liquid crystal wave plate may be on the opposite side to the alignment direction DRb with the straight line LN as a boundary. That is, the larger one of the angles formed by the alignment direction DRb and the alignment direction DRa may be in a range greater than 90° and smaller than 270°. The angle β is preferably 135° to 225°, more preferably, 150° to 210°. Contrast can be secured within this range.

In the transflective liquid crystal display device 1, the main visual angle is preferably in the direction of an azimuth at which the highest reflectivity is obtained for light reflected by the reflective electrode 63 and transmitted through the scattering layer 27. Such a configuration can secure contrast and reduce deterioration in the display quality. The direction of the main visual angle θ of the transflective liquid crystal display device 1 is preferably different from a direction in which contrast is lowest. Such a configuration can reduce deterioration in contrast.

1-7. Arrangement of Wave Plate

FIG. 17 to FIG. 25 are diagrams illustrating arrangement examples of the ¼ wavelength plate or the ½ wavelength plate as a wave plate. In these arrangement examples, both surfaces of the polarizing plate 26 are protected by protective layers 26G formed of TAC. In the example illustrated in FIG. 17, the ½ wavelength plate 25 is a stretch-type wave plate and the ¼ wavelength plate 24 is a liquid crystal wave plate. The ¼ wavelength plate 24 is provided on a surface of the scattering layer 27. The ¼ wavelength plate 24 may be a wave plate in which the liquid crystals are fixed by performing the alignment processing on the surface of a base material formed of TAC or the like and that is attached to the surface of the scattering layer 27. The ¼ wavelength plate 24 may be formed by performing the alignment processing on the surface of the scattering layer 27 to fix the liquid crystals.

Figure 17:
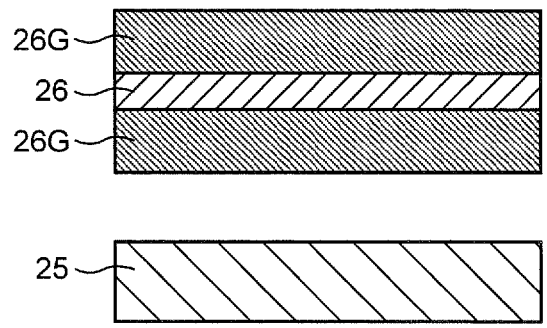
FIG. 17 is a diagram illustrating an arrangement example of a ¼ wavelength plate or a ½ wavelength plate as the wave plate.
Figure 18:
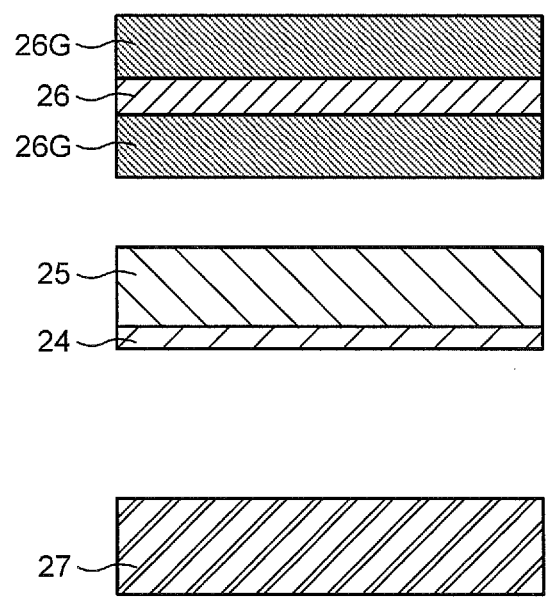
FIG. 18 is a diagram illustrating an arrangement example of the ¼ wavelength plate or the ½ wavelength plate as the wave plate.

The example illustrated in FIG. 18 is similar to the example illustrated in FIG. 17, but different therefrom in that the ¼ wavelength plate 24 is provided on the surface of the ½ wavelength plate 25 on the scattering layer 27 side. The ¼ wavelength plate 24 may be formed by performing the alignment processing on the surface of the ½ wavelength plate 25 to fix the liquid crystals, or may be a wave plate in which the liquid crystals are fixed by performing the alignment processing on the surface of a base material formed of transparent resin or the like and that is attached to the surface of the ½ wavelength plate 25.

In the example illustrated in FIG. 19, the ½ wavelength plate 25 is a liquid crystal wave plate and the ¼ wavelength plate 24 is a stretch-type wave plate. The ½ wavelength plate 25 is provided on a surface of one of the two protective layers 26G protecting the polarizing plate 26, on the ¼ wavelength plate 24 side. The ½ wavelength plate 25 may be a wave plate in which the liquid crystals are fixed by performing the alignment processing on the surface of a base material formed of TAC or the like and that is attached to the surface of the protective layer 26G. The ½ wavelength plate 25 may be formed by performing the alignment processing on the surface of the protective layer 26G to fix the liquid crystals. When the protective layer 26G is not provided, the ½ wavelength plate 25 may be formed by performing the alignment processing on the surface of the polarizing plate 26 to fix the liquid crystals.

The example illustrated in FIG. 20 is similar to the example illustrated in FIG. 19, but different therefrom in that the ½ wavelength plate 25 is provided on the surface of the ¼ wavelength plate 24 on the polarizing plate 26 side. The ½ wavelength plate 25 may be a wave plate in which the liquid crystals are fixed by performing the alignment processing on the surface of a base material formed of TAC or the like and that is attached to the surface of the ¼ wavelength plate 24. The ½ wavelength plate 25 may be formed by performing the alignment processing on the surface of the ¼ wavelength plate 24 to fix the liquid crystals.

In the example illustrated in FIG. 21, both of the ½ wavelength plate 25 and the ¼ wavelength plate 24 are liquid crystal wave plates. The ½ wavelength plate 25 is provided on the surface of one of the two protective layers 26G protecting the polarizing plate 26, on the ¼ wavelength plate 24 side. The ½ wavelength plate 25 may be a wave plate in which the liquid crystals are fixed by performing the alignment processing on the surface of a base material formed of TAC or the like and that is attached to the surface of the protective layer 26G. The ½ wavelength plate 25 may be formed by performing the alignment processing on the surface of the protective layer 26G to fix the liquid crystals. When the protective layer 26G is not provided, the ½ wavelength plate 25 may be formed by performing the alignment processing on the surface of the polarizing plate 26 to fix the liquid crystals. The ¼ wavelength plate 24 is provided on the opposite surface of the ½ wavelength plate 25 to the protective layer 26G. The ¼ wavelength plate 24 may be a wave plate in which the liquid crystals are fixed by performing the alignment processing on the surface of a base material formed of TAC or the like and that is attached to the surface of the ½ wavelength plate 25. The ¼ wavelength plate 24 may be formed by performing the alignment processing on the surface of the ½ wavelength plate 25 to fix the liquid crystals.

The example illustrated in FIG. 22 is similar to the example illustrated in FIG. 21, but different therefrom in that the ¼ wavelength plate 24 is provided on the surface of the scattering layer 27. The ¼ wavelength plate 24 is provided on the surface of the scattering layer 27 on the polarizing plate 26 side. The ¼ wavelength plate 24 may be a wave plate in which the liquid crystals are fixed by performing the alignment processing on the surface of a base material formed of TAC or the like and that is attached to the surface of the scattering layer 27. The ¼ wavelength plate 24 may be formed by performing the alignment processing on the surface of the scattering layer 27 to fix the liquid crystals. The ½ wavelength plate 25 is provided on the opposite surface of the ¼ wavelength plate 24 to the scattering layer 27. The ½ wavelength plate 25 may be a wave plate in which the liquid crystals are fixed by performing the alignment processing on the surface of a base material formed of TAC or the like and that is attached to the surface of the ¼ wavelength plate 24. The ½ wavelength plate 25 may be formed by performing the alignment processing on the surface of the ¼ wavelength plate 24 to fix the liquid crystals.

In the examples illustrated in FIG. 23 and FIG. 24, the ½ wavelength plate 25 is a stretch-type wave plate, the ¼ wavelength plate 24 is a liquid crystal wave plate, and the ¼ wavelength plate 24 is provided between the second substrate 23 and the scattering layer 27. In the example illustrated in FIG. 23, the ¼ wavelength plate 24 is provided on the surface of the scattering layer 27 on the second substrate 23 side. The ¼ wavelength plate 24 may be a wave plate in which the liquid crystals are fixed by performing the alignment processing on the surface of a base material formed of TAC or the like and that is attached to the surface of the scattering layer 27. The ¼ wavelength plate 24 may be formed by performing the alignment processing on the surface of the scattering layer 27 to fix the liquid crystals.

In the example illustrated in FIG. 24, the ¼ wavelength plate 24 is provided on the surface of the second substrate 23 on the scattering layer 27 side. The ¼ wavelength plate 24 may be a wave plate in which the liquid crystals are fixed by performing the alignment processing on the surface of a base material formed of TAC or the like and that is attached to the surface of the second substrate 23. The ¼ wavelength plate 24 may be formed by performing the alignment processing on the surface of the second substrate 23.

The example illustrated in FIG. 25 is similar to the examples illustrated in FIG. 23 and FIG. 24, but the ¼ wavelength plate 24 is provided on the surface of the second substrate 23 on the liquid crystal layer 30 side. The ¼ wavelength plate 24 may be a wave plate in which the liquid crystals are fixed by performing the alignment processing on the surface of a base material formed of TAC or the like and that is attached to the surface of the second substrate 23. The ¼ wavelength plate 24 may be formed by performing the alignment processing on the surface of the second substrate 23, more specifically, on an orientation film provided on the surface of the second substrate 23 on the liquid crystal layer 30 side to fix the liquid crystals.

When at least one of the ¼ wavelength plate 24 and the ½ wavelength plate 25 is a liquid crystal wave plate, it is preferable to use, as a base material, the polarizing plate 26, the protective layer 26G, the scattering layer 27, the second substrate 23, or the ¼ wavelength plate 24 or the ½ wavelength plate 25 formed of a stretch-type wave plate, and to perform the alignment processing on the surface thereof to fix the liquid crystals. Such a configuration eliminates the need for the base material and thus can reduce the thickness of the ¼ wavelength plate 24 or the ½ wavelength plate 25. As a result, this can reduce the thickness of the transflective liquid crystal display device 1.

2. Electronic Apparatus

The transflective liquid crystal display device 1 according to the present disclosure described above can be used as a display unit (display device) of an electronic apparatus in various fields that displays a video signal input to the electronic apparatus or a video signal generated in the electronic apparatus as an image or video. The following describes a specific example of the electronic apparatus to which the transflective liquid crystal display device 1 is applied as a display unit, that is, the electronic apparatus according to the present disclosure.

Application Example 1

The electronic apparatus illustrated in FIG. 26 is a television apparatus to which the transflective liquid crystal display device 1 is applied. For example, the television apparatus includes a video display screen unit 510 including a front panel 511 and a filter glass 512, and the transflective liquid crystal display device 1 is applied to the video display screen unit 510. That is, the screen of the television apparatus may have a function for detecting a touch operation in addition to a function for displaying an image.

Application Example 2

Figure 27:
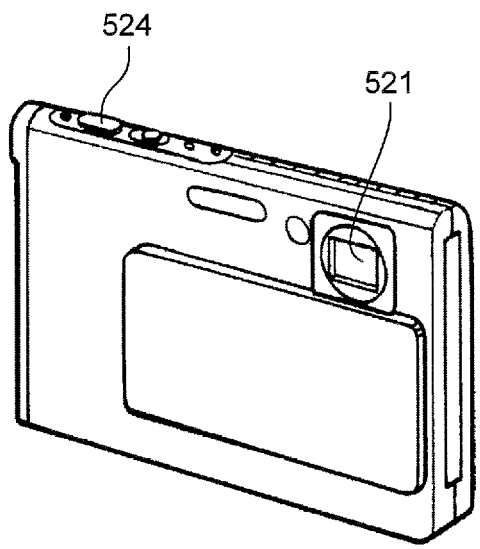
FIG. 27 is a diagram illustrating a digital camera to which the transflective liquid crystal display device is applied.
Figure 28:
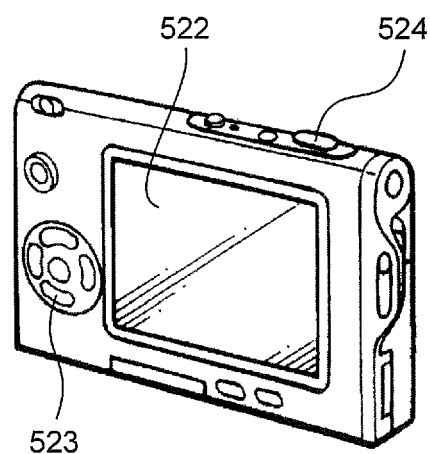
FIG. 28 is a diagram illustrating the digital camera to which the transflective liquid crystal display device is applied.

The electronic apparatus illustrated in FIG. 27 and FIG. 28 is a digital camera to which the transflective liquid crystal display device 1 is applied. For example, the digital camera includes a flash light emitting unit 521, a display unit 522, a menu switch 523, and a shutter button 524, and the transflective liquid crystal display device 1 is applied to the display unit 522. Accordingly, the display unit 522 of the digital camera may have a function for detecting a touch operation in addition to a function for displaying an image.

Application Example 3

Figure 29:
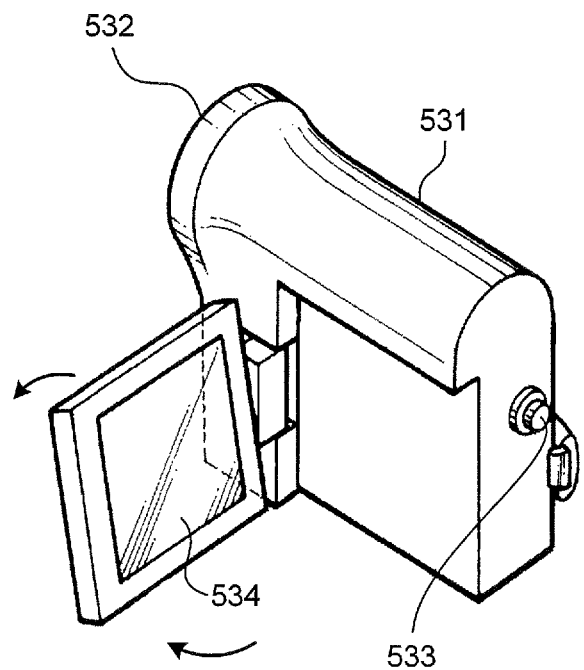
FIG. 29 is a diagram illustrating the external appearance of a video camera to which the transflective liquid crystal display device is applied.

The electronic apparatus illustrated in FIG. 29 represents the external appearance of a video camera to which the transflective liquid crystal display device 1 is applied. For example, the video camera includes a main body part 531, a lens 532 for photographing a subject provided on the front side surface of the main body part 531, a start/stop switch 533 for photographing, and a display unit 534. The transflective liquid crystal display device 1 is applied to the display unit 534. Accordingly, the display unit 534 of the video camera may have a function for detecting a touch operation in addition to a function for displaying an image.

Application Example 4

Figure 30:
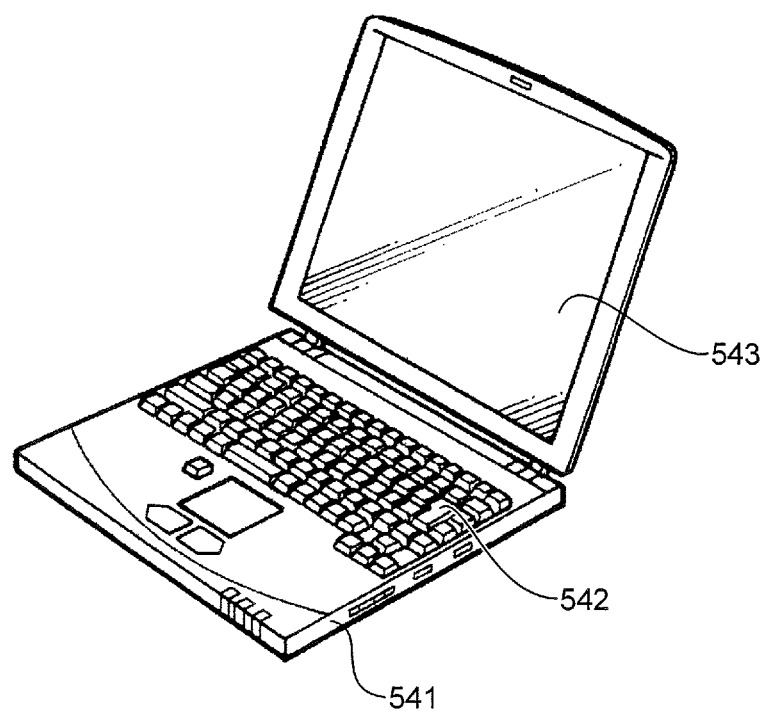
FIG. 30 is a diagram illustrating a laptop personal computer to which the transflective liquid crystal display device is applied.

The electronic apparatus illustrated in FIG. 30 is a laptop personal computer to which the transflective liquid crystal display device 1 is applied. For example, the laptop personal computer includes a main body 541, a keyboard 542 for input operation of characters and the like, and a display unit 543 for displaying an image. The transflective liquid crystal display device 1 is applied to the display unit 543. Accordingly, the display unit 543 of the laptop personal computer may have a function for detecting a touch operation in addition to a function for displaying an image.

Application Example 5

Figure 31:
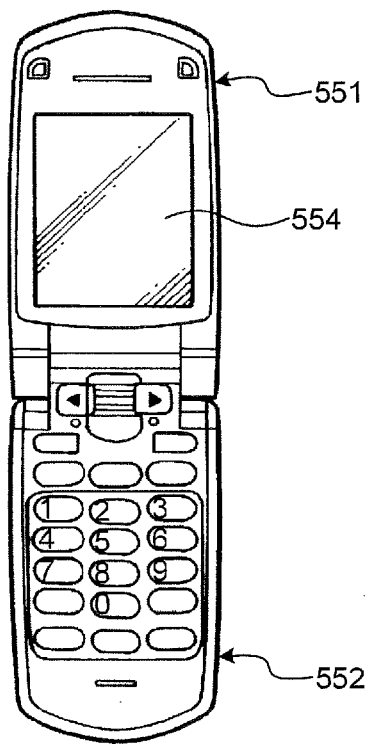
FIG. 31 is a front view of a mobile phone in an open state to which the present disclosure is applied.
Figure 32:
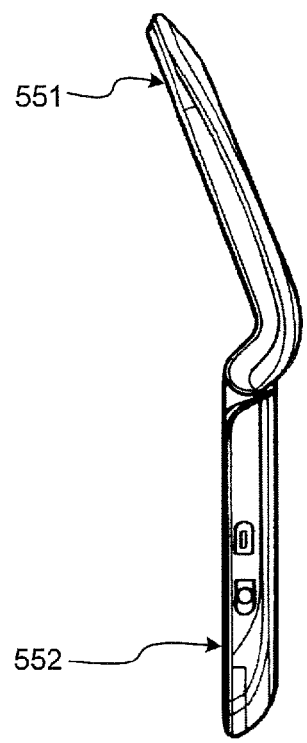
FIG. 32 is a right side view of the mobile phone in the open state to which the present disclosure is applied.
Figure 33:
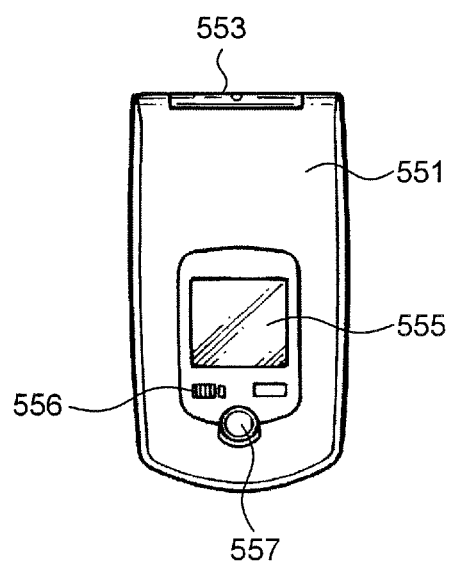
FIG. 33 is a top view of the mobile phone in a folded state to which the present disclosure is applied.
Figure 34:
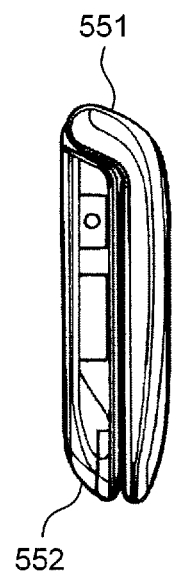
FIG. 34 is a left side view of the mobile phone in the folded state to which the present disclosure is applied.
Figure 35:
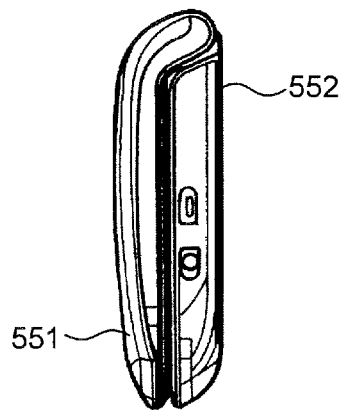
FIG. 35 is a right side view of the mobile phone in the folded state to which the present disclosure is applied.
Figure 36:
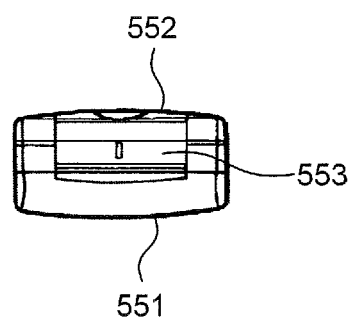
FIG. 36 is a rear view of the mobile phone in the folded state to which the present disclosure is applied.
Figure 37:
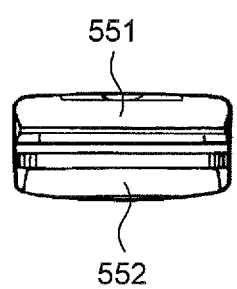
FIG. 37 is a front view of the mobile phone in the folded state to which the present disclosure is applied.

The electronic apparatus illustrated in FIG. 31 to FIG. 37 is a mobile phone to which the transflective liquid crystal display device 1 is applied. FIG. 31 is a front view of the mobile phone in an open state, FIG. 32 is a right side view of the mobile phone in the open state, FIG. 33 is a top view of the mobile phone in a folded state, FIG. 34 is a left side view of the mobile phone in the folded state, FIG. 35 is a right side view of the mobile phone in the folded state, FIG. 36 is a rear view of the mobile phone in the folded state, and FIG. 37 is a front view of the mobile phone in the folded state. For example, the mobile phone is formed by connecting an upper housing 551 and a lower housing 552 with a connecting part (hinge part) 553, and includes a display device 554, a sub-display device 555, a picture light 556, and a camera 557. The transflective liquid crystal display device 1 is attached as the display device 554. Accordingly, the display device 554 of the mobile phone may have a function for detecting a touch operation in addition to a function for displaying an image.

Application Example 6

Figure 38:
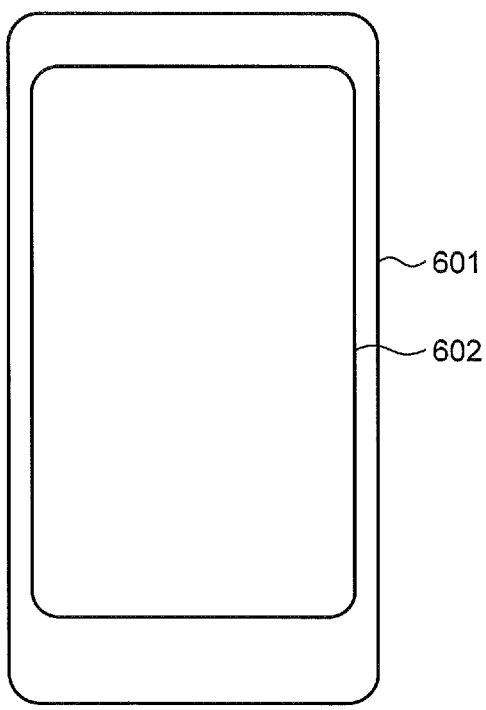
FIG. 38 is a diagram illustrating an information portable terminal to which the present disclosure is applied.

The electronic apparatus illustrated in FIG. 38 is an information portable terminal that operates as a portable computer, a multifunctional mobile phone, a portable computer allowing voice communication, or a communicable portable computer, and may be called a smart phone and/or a tablet terminal. For example, the information portable terminal includes a display unit 602 arranged on a surface of a housing 601. The display unit 562 is the transflective liquid crystal display device 1.

3. Configuration of Present Disclosure

The present disclosure includes aspects as follows.

(1) A liquid crystal display device comprising:
a first substrate on which a reflective electrode is arranged for each of a plurality of pixels;
a second substrate;
a liquid crystal layer arranged between the first substrate and the second substrate; and
a wave plate in which liquid crystals are fixed so that an alignment direction of the liquid crystals is opposite to an alignment direction of the liquid crystal layer, the wave plate being arranged on a second substrate side of the liquid crystal layer.

(2) The liquid crystal display device according to (1), further comprising a scattering layer that is arranged on an opposite side of the second substrate to the liquid crystal layer and scatters light from the liquid crystal layer side, wherein
the wave plate is arranged on an opposite side of the scattering layer to the second substrate, between the scattering layer and the second substrate, or between the second substrate and the liquid crystal layer.

(3) The liquid crystal display device according to (1), further comprising a scattering layer that is arranged on an opposite side of the second substrate to the liquid crystal layer and scatters light from the liquid crystal layer side, wherein
a main visual angle of the liquid crystal display device is in a direction of an azimuth in which reflectivity of light reflected by the reflective electrode and transmitted through the scattering layer is highest.

(4) The liquid crystal display device according to (3), wherein a direction of the main visual angle is different from a direction in which contrast is lowest.

(5) The liquid crystal display device according to (1), wherein
reflective display is performed using the reflective electrode, and
transmissive display is performed using a space between the pixels of the reflective electrode.

(6) An electronic apparatus comprising the liquid crystal display device according to (1).

The liquid crystal display device and an electronic apparatus including the same include a wave plate in which liquid crystals are fixed. The function of such a wave plate is achieved with a liquid crystal layer having a thickness of several micrometers, preventing increase in the thickness of the liquid crystal display device including a scattering layer for scattering light. In the wave plate in which the liquid crystals are fixed, the liquid crystals are fixed so that the alignment direction of liquid crystals is opposite to the alignment direction of the liquid crystal layer of the liquid crystal display device. This can reduce a phase change of light due to the wave plate, reducing deterioration in display quality.

According to the present disclosure, a liquid crystal display device including a layer for scattering light can be prevented from thickening.

What is claimed is:
1. A liquid crystal display device comprising:
a first substrate on which a reflective electrode is arranged for each of a plurality of pixels;
a second substrate;
a liquid crystal layer arranged between the first substrate and the second substrate;
a scattering layer that scatters light from the liquid crystal layer side; and a wave plate including a ¼ wavelength plate and a ½ wavelength plate, liquid crystals of at least the ¼ wavelength plate being fixed, wherein the liquid crystal layer, the second substrate, the scattering layer, the ¼ wavelength plate, and the ½ wavelength plate are sequentially stacked on the first substrate, a first alignment direction is an alignment direction of liquid crystals on a first substrate side of the liquid crystal layer, a second alignment direction is an alignment direction of the fixed liquid crystals of the ¼ wavelength plate, and the second alignment direction of the ¼ wavelength plate is opposite to the first alignment direction of the liquid crystal layer-in such a manner that an angle between the first alignment direction and the second alignment direction is in a range greater than 90 degrees and smaller than 270 degrees.

2. The liquid crystal display device according to claim 1, wherein a main visual angle of the liquid crystal display device is in a direction of an azimuth in which reflectivity of light reflected by the reflective electrode and transmitted through the scattering layer is highest.

3. The liquid crystal display device according to claim 2, wherein a direction of the main visual angle is different from a direction in which contrast is lowest.

4. The liquid crystal display device according to claim 1, wherein reflective display is performed using the reflective electrode, and transmissive display is performed using a space between the plurality of pixels of the reflective electrode.

5. The liquid crystal display device according to claim 1, wherein the angle between the first alignment direction and the second alignment direction is in the range between 135 degrees and 225 degrees.

6. The liquid crystal display device according to claim 5, wherein the angle between the first alignment direction and the second alignment direction is in the range between 150 degrees and 210 degrees.

7. An electronic apparatus comprising:

a liquid crystal display device having a first substrate on which a reflective electrode is arranged for each of a plurality of pixels, a second substrate, a liquid crystal layer arranged between the first substrate and the second substrate, a scattering layer that scatters light from the liquid crystal layer side, and a wave plate including a ¼ wavelength plate and a ½ wavelength plate, liquid crystals of at least the ¼ wavelength plate being fixed, wherein the liquid crystal layer, the second substrate, the scattering layer, the ¼ wavelength plate, and the ½ wavelength plate are sequentially stacked on the first substrate, a first alignment direction is an alignment direction of liquid crystals on a first substrate side of the liquid crystal layer, a second alignment direction is an alignment direction of the fixed liquid crystals of the ¼ wavelength plate, and the second alignment direction of the ¼ wavelength plate is opposite to the first alignment direction of the liquid crystal layer in such a manner that an angle between the first alignment direction and the second alignment direction is in a range greater than 90 degrees and smaller than 270 degrees.

8. The electronic apparatus according to claim 7, wherein a main visual angle of the liquid crystal display device is in a direction of an azimuth in which reflectivity of light reflected by the reflective electrode and transmitted through the scattering layer is highest.

9. The electronic apparatus according to claim 8, wherein a direction of the main visual angle is different from a direction in which contrast is lowest.

10. The electronic apparatus according to claim 7, wherein reflective display is performed using the reflective electrode, and transmissive display is performed using a space between the plurality of pixels of the reflective electrode.

11. The electronic apparatus according to claim 7, wherein the angle between the first alignment direction and the second alignment direction is in the range between 135 degrees and 225 degrees.

12. The electronic apparatus according to claim 11, wherein the angle between the first alignment direction and the second alignment direction is in the range between 150 degrees and 210 degrees.

* * * * *